(12) United States Patent
Barhoum et al.

(10) Patent No.: US 11,846,944 B2
(45) Date of Patent: Dec. 19, 2023

(54) TAKEOFF PERFORMANCE ALERT

(71) Applicant: THE BOEING COMPANY, Chicago, IL (US)

(72) Inventors: Erek S. Barhoum, Mukilteo, WA (US); Paul E. Poteet, Seattle, WA (US); Ross Godwin, Kirkland, WA (US); John Richard Shipway, Edmonds, WA (US); Hamid Reza Radfar, Kirkland, WA (US); Hien M. Tang, Sammamish, WA (US)

(73) Assignee: THE BOEING COMPANY, Arlington, VA (US)

( * ) Notice: Subject to any disclaimer, the term of this patent is extended or adjusted under 35 U.S.C. 154(b) by 42 days.

(21) Appl. No.: 17/650,464

(22) Filed: Feb. 9, 2022

(65) Prior Publication Data
US 2023/0251654 A1  Aug. 10, 2023

(51) Int. Cl.
G05D 1/00 (2006.01)
B64D 43/00 (2006.01)
G05D 1/06 (2006.01)

(52) U.S. Cl.
CPC ........... *G05D 1/0083* (2013.01); *B64D 43/00* (2013.01); *G05D 1/0661* (2013.01)

(58) Field of Classification Search
CPC .... G05D 1/0083; G05D 1/0661; B64D 43/00; B64C 19/00
See application file for complete search history.

(56) References Cited

U.S. PATENT DOCUMENTS

| | | | |
|---|---|---|---|
| 4,454,582 A | 6/1984 | Cleary et al. | |
| 5,047,942 A * | 9/1991 | Middleton | G05D 1/0083 701/16 |
| 5,103,224 A | 4/1992 | Arad | |
| 5,353,022 A | 10/1994 | Middleton et al. | |
| 5,480,107 A | 1/1996 | Bacon | |
| 6,790,041 B2 | 9/2004 | Fountain | |
| 10,202,204 B1 * | 2/2019 | Daidzic | B64C 5/02 |

(Continued)

FOREIGN PATENT DOCUMENTS

JP  H06298022 A  10/1994

OTHER PUBLICATIONS

Extended European Search Report for Application No. 23155904.8 dated Apr. 12, 2023, pp. 1-7.

(Continued)

*Primary Examiner* — Aaron L Troost
(74) *Attorney, Agent, or Firm* — Moore IP Law

(57) ABSTRACT

An aircraft includes at least one line replaceable unit (LRU) configured to determine, based on initial data collected prior to a takeoff roll of the aircraft, a takeoff rotation speed of the aircraft and a rotation time associated with the takeoff rotation speed. The LRU is configured to determine, during the takeoff roll and prior to the rotation time, a predicted speed of the aircraft at the rotation time. The predicted speed is at least partially based on data collected during the takeoff roll. The LRU is also configured to determine whether an alert condition is satisfied at least partially based on whether a disparity between the takeoff rotation speed and the predicted speed exceeds a rotation speed disparity threshold and to generate a takeoff performance alert in response to the alert condition being satisfied.

20 Claims, 14 Drawing Sheets

(56) References Cited

U.S. PATENT DOCUMENTS

| | | | |
|---|---|---|---|
| 10,302,451 B1* | 5/2019 | Kim | G01P 13/025 |
| 2008/0215198 A1 | 9/2008 | Richards | |
| 2012/0206358 A1* | 8/2012 | Green | G01C 23/00 |
| | | | 345/157 |
| 2014/0257603 A1 | 9/2014 | McKeown et al. | |
| 2018/0061243 A1 | 3/2018 | Shloosh | |
| 2019/0049953 A1* | 2/2019 | Dong | B64D 45/00 |
| 2019/0056740 A1* | 2/2019 | Westphal | G05D 1/02 |
| 2019/0106089 A1* | 4/2019 | Pandey | B60T 8/171 |
| 2019/0276160 A1* | 9/2019 | Kipersztok | G05D 1/0661 |
| 2021/0158709 A1* | 5/2021 | Schwindt | B64D 43/02 |
| 2022/0058963 A1* | 2/2022 | Horne | G08G 5/0065 |

OTHER PUBLICATIONS

"Takeoff Surveillance & Monitoring Functions," Aircraft, Safety first #29, Oct. 2019, pp. 1-11.

* cited by examiner

1100

Determine, at least partially based on initial data collected prior to the takeoff roll, an estimated initial amount of remaining runway 1102

Determine, at least partially based on data collected during the takeoff roll, an updated all-engine go distance to achieve a designated screen height 1104

Determine whether the updated all-engine go distance to achieve the designated screen height is greater than the estimated initial amount of remaining runway 1106

Determine, at least partially based on data collected during the takeoff roll, an updated all-engine go distance to achieve a designated screen height 1202

Determine, at least partially based on the data collected during the takeoff roll, an updated distance to reach a tire limit speed 1204

Determine whether the alert condition is satisfied is further based on determining whether the updated all-engine go distance is greater than the updated distance to reach the tire limit speed 1206

FIG. 12

```
                                                    ┌─ 1300

┌──────────────────────────────────────────────────────────────────┐
│ Display a visual indicator instructing an operator of the        │
│ aircraft to reject takeoff 1302                                  │
└──────────────────────────────────────────────────────────────────┘
                              ▼
┌──────────────────────────────────────────────────────────────────┐
│ Generate an audible command instructing the operator of the      │
│ aircraft to reject takeoff 1304                                  │
└──────────────────────────────────────────────────────────────────┘
                              ▼
┌──────────────────────────────────────────────────────────────────┐
│ If the aircraft includes at least one of a military aircraft or  │
│ an unmanned aircraft, automatically reject takeoff in response   │
│ to generation of the takeoff performance alert 1306              │
└──────────────────────────────────────────────────────────────────┘
```

FIG. 13

```
                                                    ┌─ 1400

┌──────────────────────────────────────────────────────────────────┐
│ Automatically adjust operation of an engine to an idle forward   │
│ thrust 1402                                                      │
└──────────────────────────────────────────────────────────────────┘
                              ▼
┌──────────────────────────────────────────────────────────────────┐
│ Automatically deploy a thrust reverser 1404                      │
└──────────────────────────────────────────────────────────────────┘
                              ▼
┌──────────────────────────────────────────────────────────────────┐
│ Automatically initiate braking of the aircraft 1406              │
└──────────────────────────────────────────────────────────────────┘
```

FIG. 14

TAKEOFF PERFORMANCE ALERT

FIELD OF THE DISCLOSURE

The present disclosure is related to a device that generates an alert based on takeoff performance of an aircraft.

BACKGROUND

During takeoff of an aircraft, one or more conditions may occur that could result in a less than optimal flight experience. The decision of whether to continue the takeoff, in the event that one or more such conditions occur, is a time-sensitive decision. For example, a pilot of the aircraft has a relatively short amount of time to decide whether to complete the takeoff or reject the takeoff.

SUMMARY

According to one implementation of the present disclosure, an aircraft includes at least one line replaceable unit configured to determine, based on initial data collected prior to a takeoff roll of the aircraft, a takeoff rotation speed of the aircraft and a rotation time associated with the takeoff rotation speed. The line replaceable unit is configured to determine, during the takeoff roll and prior to the rotation time, a predicted speed of the aircraft at the rotation time. The predicted speed is at least partially based on data collected during the takeoff roll. The line replaceable unit is configured to determine whether an alert condition is satisfied at least partially based on whether a disparity between the takeoff rotation speed and the predicted speed exceeds a rotation speed disparity threshold. The line replaceable unit is also configured to generate a takeoff performance alert in response to the alert condition being satisfied.

According to another implementation of the present disclosure, a method for generating a takeoff performance alert during a takeoff associated with an aircraft includes determining, based on initial data collected prior to a takeoff roll of the aircraft, a takeoff rotation speed of the aircraft and a rotation time associated with the takeoff rotation speed. The method includes determining, during the takeoff roll and prior to the rotation time, a predicted speed of the aircraft at the rotation time. The predicted speed is at least partially based on data collected during the takeoff roll. The method includes determining whether an alert condition is satisfied at least partially based on whether a disparity between the takeoff rotation speed and the predicted speed exceeds a rotation speed disparity threshold. The method also includes, in response to determining that the alert condition is satisfied, generating the takeoff performance alert.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 11 is a diagram that illustrates a flow chart of a first example of a method for generating a takeoff performance alert based on an all-engine go distance to achieve a designated screen height during a takeoff associated with an aircraft.

FIG. 12 is a diagram that illustrates a flow chart of a second example of a method for generating a takeoff performance alert based on an all-engine go distance to achieve a designated screen height during a takeoff associated with an aircraft.

FIG. 13 is a diagram that illustrates a flow chart of an example of a method for generating a takeoff performance alert.

FIG. 14 is a diagram that illustrates a flow chart of an example of a method for automatically rejecting a takeoff associated with a military or unmanned aircraft in response to generation of a takeoff performance alert.

DETAILED DESCRIPTION

Figure 1:
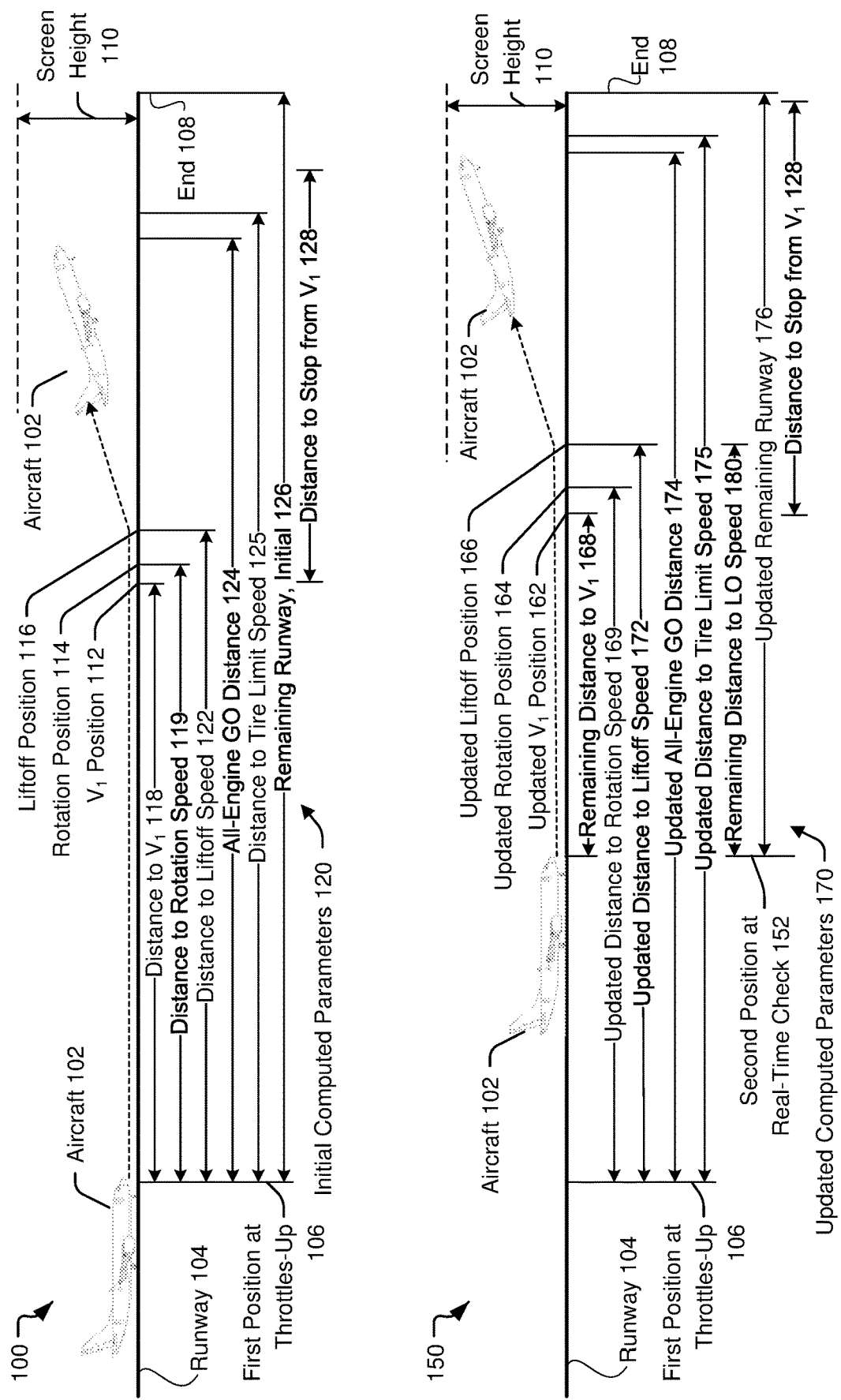
FIG. 1 is a diagram that illustrates various parameters related to takeoff of an aircraft that are determined during an initial check and updated parameters that are determined during a takeoff roll of the aircraft.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation.

As a result, this disclosure is not limited to the specific embodiments or examples described below, but by the claims and their equivalents.

The techniques described herein enable generation of a takeoff performance alert (TPA) to enable an operator of an aircraft to determine, during a takeoff roll, whether to continue a takeoff of the aircraft or to reject the takeoff. According to an aspect, the TPA utilizes takeoff performance parameters that are based on All-Engine (AE) performance and that correspond to counterpart Engine-Out (EO) parameters such as Go Distance, Accel-Stop Distance, Time to $V_R$, etc.

According to an aspect, the AE parameters are used to compare speeds and distances that the aircraft should be achieving versus the actual performance of the aircraft based on real-time measurements made during the takeoff roll. In an example, if the AE distance to achieve screen height is greater than the runway remaining when the takeoff is started, the TPA is annunciated. In another example, if the stop distance from the takeoff decision speed ($V_1$) would result in a runway excursion, the TPA is annunciated. Annunciating the TPA can include communicating the TPA to an operator of the aircraft via one or more visual indicators, audible indicators, other indicators, or a combination thereof.

In some scenarios, calculated speeds such as the takeoff decision speed ($V_1$), rotation speed ($V_R$), and takeoff safety speed ($V_2$) are incorrect due to an input error, such as a lighter-than-actual takeoff weight. In such scenarios, the TPA is annunciated if the predicted airspeed at the time of $V_R$ ($V_{tVR}$) is significantly less than $V_R$ and the distance to achieve screen height ($S_{GO\text{-}TPA}$) is greater than the runway remaining. The determination of the predicted airspeed at the time of $V_R$ and the distance to achieve screen height, as well as the decision to annunciate the TPA, can be made during the takeoff roll, such as when the groundspeed of the aircraft has reached 70 knots.

In other scenarios with similar errors as above (e.g., due to incorrect inputs of weight and/or thrust), the runway length may be very long. In such cases, the TPA can be annunciated in response to the predicted airspeed at the time of $V_R$ ($V_{tVR}$) being significantly less than $V_R$ and the distance to achieve tire speed limit ($S_{VtireLimit}$) (e.g., a safety criteria for ensuring tire integrity) is less than the distance to achieve screen height.

According to various examples, AE parameters that are used in conjunction with determining whether to generate the TPA include:

a. $V_R$, rotation speed
b. $V_1$, decision speed
c. $V_2$, takeoff safety speed
d. $t_{VR}$, time at $V_R$
e. $S_{V1}$, distance to $V_1$
f. $S_{LO}$, distance to liftoff
g. $V_{LO}$, liftoff speed
h. $S_{GO\text{-}AE}$, All-Engine Go Distance
i. $S_{V1STOP}$, distance required to stop from $V_1$
j. $W_{FMC}$, Runway Wind According to some aspects, the V-speeds (parameters a, b, and c listed above) from a flight management computer (FMC) are separately calculated based on the crew inputs into a control display unit (CDU), and are made available for computations associated with the TPA. In an illustrative example, a crew enters V-speeds calculated from a separate application, such as an onboard performance tool (OPT). These crew-entered V-speeds do not overwrite the V-speeds calculated by the FMC. Parameters d-i listed above are newly introduced parameters and are based on all-engine performance. $W_{FMC}$ (parameter j, above) is the runway wind, which is not a new FMC parameter but is being utilized in a new and different way than in conventional systems.

Thus, techniques described herein utilize unconventional parameters and real-time measurements during a takeoff roll to enable a determination of whether an aircraft's performance deviates from its expected performance to an extent that warrants rejection of the takeoff. As a result, one or more conditions affecting aircraft performance can be quickly detected, enabling an improved flight experience.

FIG. 1 includes a first diagram 100 illustrating initial computed parameters 120 associated with a takeoff of an aircraft 102 at throttles-up and a second diagram 150 illustrating updated computed parameters 170 associated with the takeoff of the aircraft 102 during the takeoff roll. According to an aspect, the initial parameters 120 and the updated parameters 170 are determined based on All Engine (AE) performance, which corresponds to all engines of the aircraft 102 working during the takeoff roll.

The first diagram 100 depicts the aircraft 102 having a first position 106 on a runway 104 at throttles-up. A $V_1$ position 112 indicates an estimated position of the aircraft 102 when the aircraft 102 reaches a takeoff decision speed ($V_1$) (e.g., the speed beyond which a takeoff cannot be rejected without overrunning an end 108 of the runway 104). A rotation position 114 indicates an estimated position of the aircraft 102 when the aircraft 102 reaches a takeoff rotation speed ($V_R$). A liftoff position 116 indicates an estimated position of the aircraft 102 when the aircraft 102 reaches a liftoff speed ($V_{LO}$). The $V_1$ position 112, the rotation position 114, the liftoff position 116, or a combination thereof, can be included in the initial parameters 120.

The initial parameters 120 include an estimated distance ($S_{V1}$) 118 to reach the takeoff decision speed, an estimated distance ($S_{VR}$) 119 to reach the rotation speed, and an initial estimated distance ($S_{LO}$) 122 to achieve the liftoff speed. The initial parameters 120 also include an estimated all-engine go distance ($S_{GO\text{-}AE}$) 124 to achieve a designated screen height 110 (e.g., 35 feet above the runway 104) and an estimated distance 125 to achieve a tire limit speed (e.g., an upper limit on ground speed to ensure the integrity of the tires of the aircraft 102). An estimated initial amount of remaining runway ($RR_0$) 126 indicates a distance from the first position 106 to the end 108 of the runway 104. The initial parameters 120 also include an estimated distance ($S_{V1STOP}$) 128 required to come to a stop from the takeoff decision speed ($V_1$).

One or more of the initial parameters 120 can be computed prior to throttles-up based on user-entered data (e.g., the weight of the aircraft 102, runway length, and runway winds entered into a flight management computer). Others of the initial parameters 120 are computed upon detection of throttles-up. For example, the estimated initial amount of remaining runway 126 can be computed upon detection of activation of a takeoff/go-around (TO/GA) control, or upon detection that an engine metric N1 (e.g., a rotational speed of a low pressure turbine spool) satisfies a threshold, to ensure that the aircraft 102 is no longer taxiing and has begun the takeoff roll, as illustrative, non-limiting examples.

One or more systems of the aircraft 102 performs one or more initial checks based on the initial parameters 120 at the first position 106. In an example, the initial checks include determining that the all-engine go distance 124 is less than the estimated initial amount of remaining runway 126 (or is less than the estimated initial amount of remaining runway 126 by more than a threshold amount), indicating that the aircraft 102 can lift off and reach the screen height 110 by the end 108 of runway 104. In another example, the initial checks include determining that the amount of remaining runway is not less than the sum of the distance to $V_1$ 118 and the distance to stop from $V_1$ 128, as described in further detail with reference to FIGS. 3-5.

The second diagram 150 depicts the aircraft 102 having a second position 152 during the takeoff roll. During the takeoff roll, sensors in the aircraft 102 collect acceleration, position, and ground speed data, which are used to determine the updated parameters 170. To illustrate, an updated $V_1$ position 162, an updated rotation position 164, and updated liftoff position 166 are calculated.

Some of the updated parameters 170 are determined relative to the second position 152. For example, a remaining distance to $V_1$ 168 represents a distance between the second position 152 and the updated $V_1$ position 162, a remaining distance to liftoff speed 180 represents a distance between the second position 152 and the updated liftoff position 166, and an updated remaining runway 176 represents a distance between the second position 152 and the end 108 of the runway 104.

Some of the updated parameters 170 are determined relative to the first position 106. For example, an updated distance to rotation speed 169 indicates an estimate of the distance from the first position 106 to the updated rotation position 164. An updated distance to liftoff speed 172 indicates an estimate of the distance from the first position 106 to the updated liftoff position 166. An updated all-engine go distance 174 indicates an estimate of the distance from the first position 106 to achieve the designated screen height 110. An updated distance 175 to tire limit speed indicates an estimate of the distance from the first position 106 to reach the tire limit speed.

During the takeoff roll, when the aircraft 102 reaches the second position 152, one or more systems of the aircraft 102 perform a real-time check using the updated parameters 170. For example, the real-time check can include one or more of: comparing the rotation speed ($V_R$) to an estimated speed that the aircraft 102 will be traveling at the point in time that the rotation speed was originally estimated to occur, comparing the updated all engine go distance 174 to the estimated initial amount of remaining runway ($RR_0$) 126, comparing the updated all-engine go distance 174 to the updated distance 175 to tire limit speed, comparing how closely the updated distance to liftoff speed 172 matches the initial estimated distance 122 to achieve the liftoff speed, comparing the remaining distance to liftoff speed 180 to the updated remaining runway 176, verifying that the updated remaining runway 176 is not less than the sum of the remaining distance to $V_1$ 168 and the distance to stop from $V_1$ 128, one or more other checks, or any combination thereof.

As illustrated, the estimated positions at which the aircraft 102 reaches the takeoff decision speed ($V_1$), the rotation speed ($V_R$), and the liftoff speed ($V_{LO}$) are further down the runway 104 in the second diagram 150 than in the first diagram 100. One potential reason could be that the aircraft 102 is accelerating at a slower rate than was expected when generating computing the initial parameters 120. Illustrative, non-limiting examples of conditions which may cause lower than expected acceleration can include a lower than expected thrust output, drag due to a brake that has not fully released, drag due to a runway surface condition (e.g., water, snow, ice, or slush), an incorrect takeoff weight or thrust of the aircraft 102 entered into a flight management computer, one or more other conditions, or a combination thereof. In another example, the estimated positions would be further down the runway 104 if the aircraft 102 began its takeoff roll at an incorrect position on the runway 104, such as when the aircraft 102 entered the runway 104 at an intersection that does not match an intersection that was entered in the flight management computer. In some implementations, such an incorrect position on the runway 104 is detected as part of the initial check(s) performed upon detection of throttles-up.

In response to detection of an error during the initial check(s) at the first position 106 or during the real-time check(s) at the second position 152, one or more systems of the aircraft 102 generate a takeoff performance alert to instruct an operator of the aircraft 102 to reject the takeoff. As a result, deviation from expected performance during the takeoff roll can be detected prior to the aircraft 102 reaching $V_1$, and the aircraft 102 can safely abort the takeoff roll and exit the runway 104 for investigation into the cause of the deviation from the initial computed parameters 120.

Figure 2:
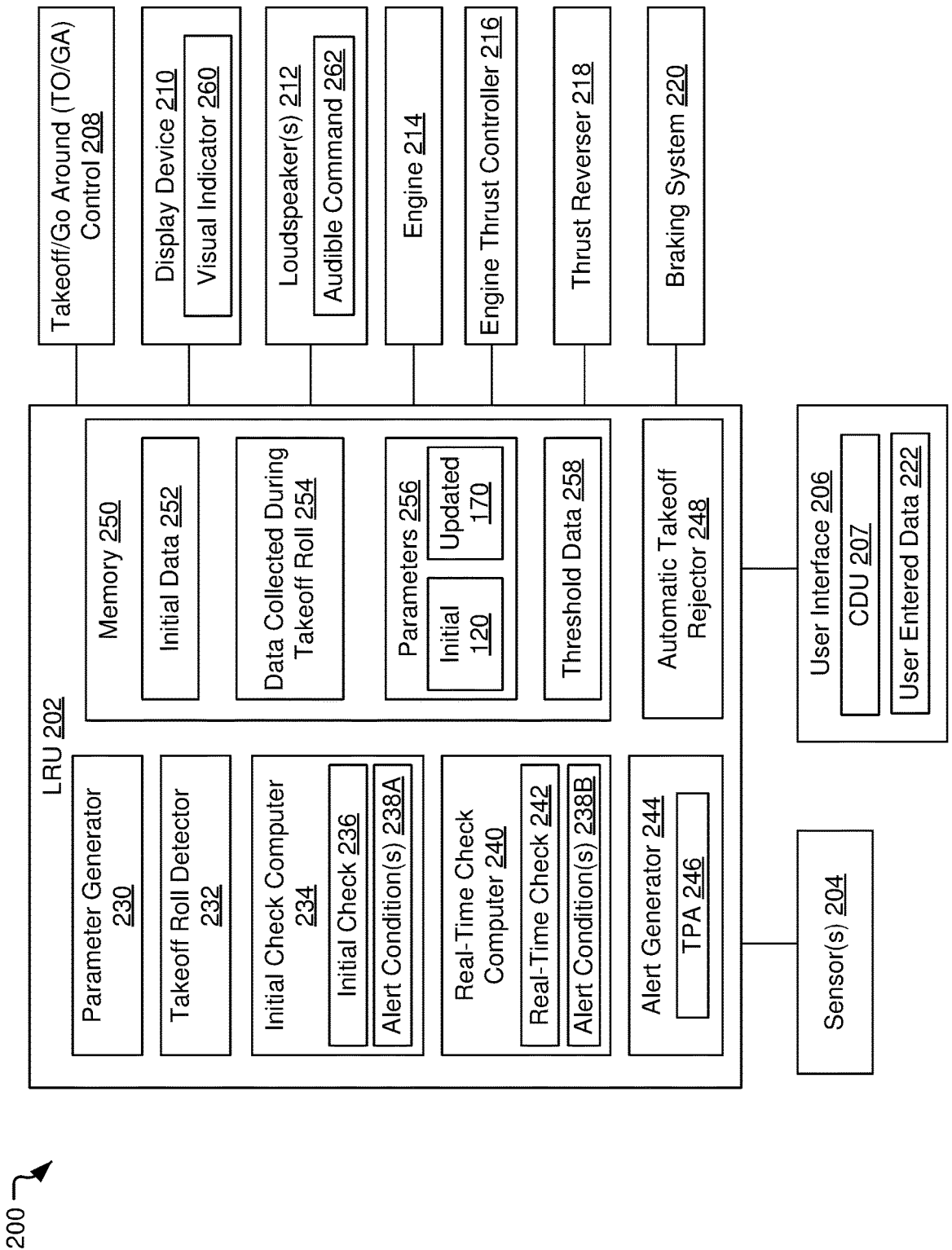
FIG. 2 is a block diagram of a system that may be implemented in the aircraft of FIG. 1.

FIG. 2 depicts a system 200 that can be implemented in the aircraft 102 and that is configured to generate a takeoff performance alert (TPA) 246 during a takeoff. The system 200 includes a line replaceable unit (LRU) 202. The LRU 202 is coupled to one or more sensors 204, a user interface 206, a takeoff/go around (TO/GA) control 208, a display device 210, one or more loudspeakers 212, an engine 214, an engine thrust controller 216, a thrust reverser 218, and a braking system 220.

The sensor(s) 204 correspond to one or more sensing devices that can provide sensing data that is used to determine the initial parameters 120, the updated parameters 170, or both. In some implementations, the sensor(s) 204 can provide initial data 252 and data 254 collected during the takeoff roll. The initial data 252 can be used to generate the initial parameters 120 and can be used in conjunction with the data 254 collected during the takeoff roll to determine the updated parameters 170. In a particular implementation, the sensor(s) 204 correspond to one or more of a location sensor (e.g., a global navigational satellite system (GNSS), global positioning system (GPS), or local positioning system to detect a position of the aircraft 102 on the runway 104), a wind speed sensor, a ground speed sensor, an engine speed sensor, a clock or timer, a ground distance sensor, one or more other sensors, or a combination thereof.

The user interface 206 is coupled to the LRU 202 and configured to receive the initial data 252 as user-entered data 222. In an illustrative example, the user interface 206 corresponds to or includes a control display unit (CDU) 207 that enables data to be input to a flight management computer (FMC). According to an implementation, the user-entered data 222 includes runway winds, runway length, temperature, aircraft weight, etc.

The TO/GA control 208 is configured to receive user input (e.g., actuation of a switch) instructing activation of take-off or go-around thrust. In an implementation, actuation of the TO/GA control 208 causes the engine 214 of the aircraft 102 to increase output to match N1 or another predetermined value.

In some implementations, the display device 210 corresponds to one or more visual display instruments, such as an engine-indicating and crew-alerting system (EICAS) display, a primary flight display (PFD), a master warning light, a head-up display (HUD), one or more other visual display instruments, or a combination thereof. The display device 210 is configured to output a visual indicator 260 to indicate the takeoff performance alert 246. The loudspeaker(s) 212 correspond to one or more acoustic transducers configured to provide an audible indicator, such as an audible command 262, to announce the takeoff performance alert 246. Examples of the display device 210 and the loudspeaker(s) 212 are described in further detail with reference to FIG. 6.

The engine thrust controller 216 is configured to control a thrust of the engine 214, such as to increase or decrease speed of the aircraft 102. The thrust reverser 218 is configured to selectively redirect the airflow of the engine 214 to create drag and reduce speed of the aircraft 102 while on the ground. The braking system 220 is configured to apply brakes to oppose rotation of wheels of the aircraft 102 and reduce speed of the aircraft 102 while on the ground.

The LRU 202 includes a parameter generator 230, a takeoff roll detector 232, an initial check computer 234, a real-time check computer 240, an alert generator 244, an automatic takeoff rejector 248, and a memory 250. In some implementations, the LRU 202 corresponds to or includes a flight management computer (FMC). Although the LRU 202 is illustrated as including the parameter generator 230, the takeoff roll detector 232, the initial check computer 234, the real-time check computer 240, the alert generator 244, the automatic takeoff rejector 248, and the memory 250 in a single line replaceable unit, in other implementations functionality associated with the parameter generator 230, the takeoff roll detector 232, the initial check computer 234, the real-time check computer 240, the alert generator 244, the automatic takeoff rejector 248, and the memory 250 are distributed across a network of multiple line replaceable units, which are collectively referred to as the LRU 202.

The parameter generator 230 is configured to generate (e.g., compute, look up, or otherwise obtain) values of parameters 256 based on the initial data 252 and based on the data 254 collected during a takeoff roll of the aircraft 102. To illustrate, the parameter generator 230 is configured to generate the initial parameters 120 for use in an initial check 236 and the updated parameters 170 for use in a real-time check 242.

The takeoff roll detector 232, is configured to detect when the aircraft 102 is no longer taxiing and has commenced a takeoff roll. In a first example, the takeoff roll detector 232 is configured to detect actuation of the TO/GA control 208 to detect the start of a takeoff roll. In a second example, the takeoff roll detector 232 is configured to detect that the engine metric N1 of the engine 214 satisfies (e.g., reaches) an engine speed threshold, such as N1=60% in an illustrative, non-limiting example.

The initial check computer 234 includes one or more processing units programmed to execute instructions, dedicated hardware or circuitry, or a combination thereof. The initial check computer 234 is configured to perform the initial check 236 in response to the takeoff roll detector 232 detecting that the aircraft 102 has commenced its takeoff roll (e.g., in response to at least one of activation of the takeoff/go around control 208 or an engine speed metric reaching an engine speed threshold).

According to an aspect, the initial check 236 includes a determination of the estimated initial amount of remaining runway 126 and determination of whether the aircraft 102 is predicted to have sufficient runway to: reach the takeoff decision speed ($V_1$), reject takeoff upon reaching the takeoff decision speed, and after rejecting the takeoff, come to a stop before reaching the end 108 of the runway 104. In an illustrative example, the initial check computer 234 causes the parameter generator 230 to determine the estimated initial amount of remaining runway 126 in response to the takeoff roll detector 232 detecting commencement of the takeoff roll. The initial check computer 234 accesses the distance to $V_1$ 118, the distance to stop from $V_1$ 128, and the estimated initial amount of remaining runway 126 from the initial parameters 120 in the memory 250 and performs computations as to whether the aircraft 102 has sufficient runway to stop from $V_1$, such as described further with reference to FIG. 4. If the initial check computer 234 determines that the aircraft 102 does not have sufficient runway to stop from $V_1$, the initial check computer 234 indicates an alert condition 238A.

Figure 4:
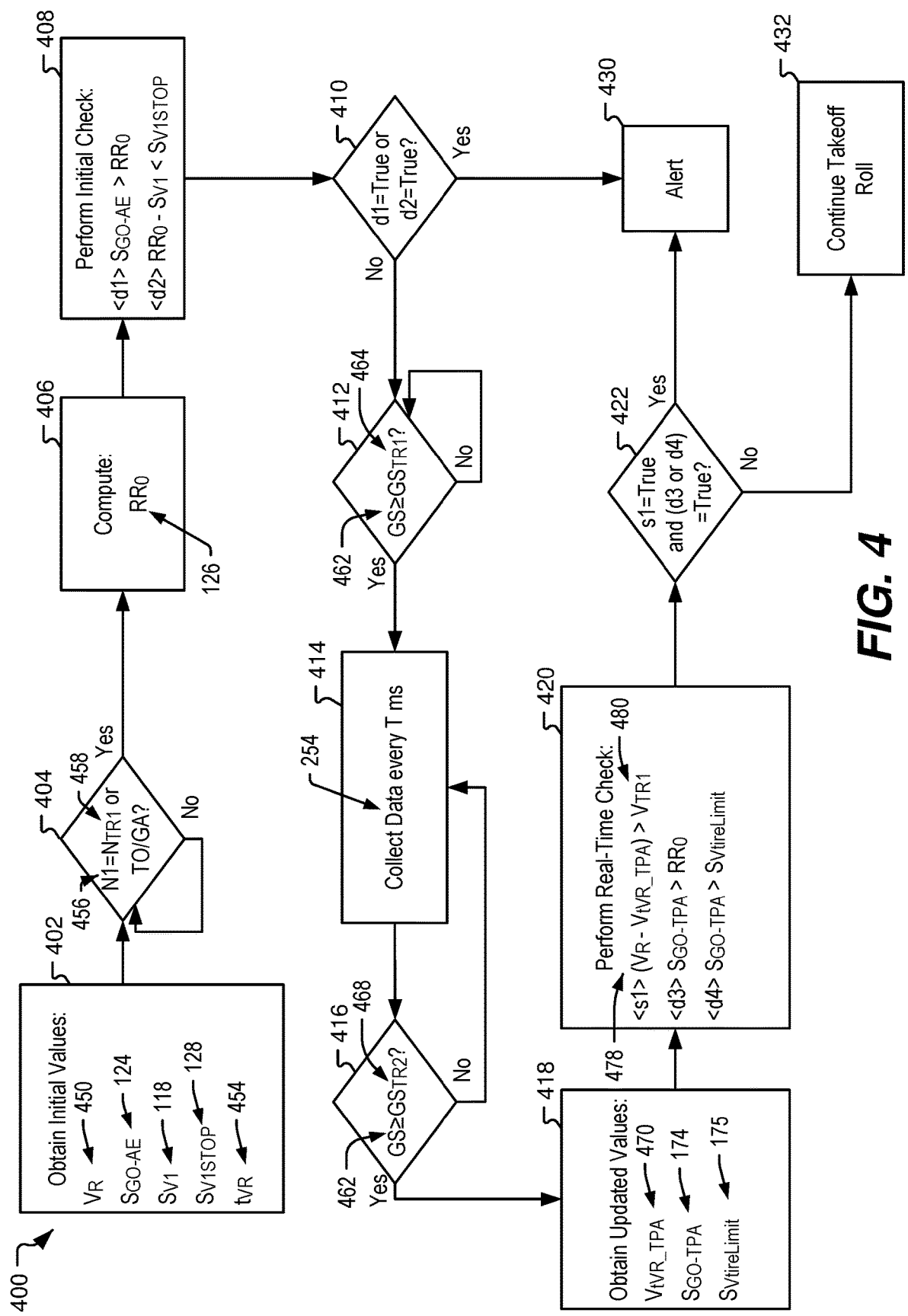
FIG. 4 is a diagram that illustrates a flow chart of a second example of a method that may be performed by the system of FIG. 2.

According to an aspect, the initial check 236 includes determining an estimation of the all-engine go distance 124 (e.g., accessing the all-engine go distance 124 from the initial parameters 120 in the memory 250) and determining whether the all-engine go distance 124 is less than the estimated initial amount of remaining runway 126, such as described further with reference to FIG. 4. If the initial check computer 234 determines that the aircraft 102 does not have sufficient runway to take off and achieve the screen height 110, the initial check computer 234 indicates an alert condition 238A. In an alternative example, a determination can be made as to whether the all-engine go distance 124 is less than a threshold distance of the initial amount of remaining runway 126, where the threshold distance corresponds to a safety margin (e.g., 200 feet). To illustrate, the threshold distance may be retrieved from threshold data 258 stored in the memory 250.

The real-time check computer 240 includes one or more processing units programmed to execute instructions, dedicated hardware or circuitry, or a combination thereof. The real-time check computer 240 is configured to perform a real-time check 242 during the takeoff roll. In a particular implementation, the real-time check computer 240 performs the real-time check 242 in response to a ground speed of the aircraft 102 reaching a ground speed threshold (e.g., 70 knots), as described further with reference to FIG. 4.

According to an aspect, the real-time check 242 includes determining, based on the initial data 252, a takeoff rotation speed ($V_R$) of the aircraft 102 and a rotation time $t_{VR}$ associated with $V_R$. In an example, $V_R$ and $t_{VR}$ are determined by the parameter generator 230 and are retrieved, by the real-time check computer 240, from the initial parameters 120 in the memory 250. In some implementations, the real-time check computer 240, upon determining that the ground speed of the aircraft 102 has reached the ground speed threshold, instructs the parameter generator 230 to generate the updated parameters 170 based on the initial data 252, the data 254 collected during the takeoff roll, or combinations thereof. The updated parameters 170 include a predicted speed ($V_{tVR\_TPA}$) of the aircraft 102 at the rotation time $t_{VR}$. The real-time check computer 240 determines whether an alert condition 238B is satisfied at least partially based on whether a disparity between the takeoff rotation speed $V_R$ and the predicted speed $V_{tVR\_TPA}$ exceeds a rotation speed disparity threshold, as described further with reference to FIG. 4. To illustrate, the rotation speed disparity threshold may be retrieved from the threshold data 258 in the memory 250.

According to an aspect, the real-time check 242 includes determining (e.g., via the parameter generator 230), at least partially based on the data 254 collected during the takeoff roll, the updated all-engine go distance 174 and the updated distance 175 to tire limit speed. In some implementations, the real-time check 242 includes determining whether the alert condition 238B is satisfied further based on whether the updated all-engine go distance 174 exceeds the estimated initial amount of remaining runway ($RR_0$) 126, whether the updated all-engine go distance 174 exceeds the updated distance 175 to reach the tire limit speed, or both. In some implementations, the real-time check 242 evaluates one or more other conditions when determining whether the alert condition 238B is satisfied, such as how closely the initial estimated distance 122 to achieve the liftoff speed matches the updated estimated distance 172 to achieve the liftoff speed, whether the remaining distance 180 to achieve the liftoff speed is within a safety margin of the updated amount of remaining runway 176, whether the updated amount of remaining runway 176 is sufficient for the aircraft 102 to come to a stop if, when the aircraft 102 reaches the takeoff decision speed ($V_1$), or any combination thereof. An illustrative example of the real-time check 242 is described further with reference to FIG. 4.

The alert generator 244 is configured to generate a takeoff performance alert 246 in response to any one or more of the alert conditions 238 being satisfied. For example, if one or more alert conditions 238A are detected during the initial check 236, the alert generator 244 generates the takeoff performance alert 246 at the first position 106 of FIG. 1 (at throttles-up) to cause an operator of the aircraft 102 to reject takeoff at the beginning of the takeoff roll. As another example, if no alert conditions 238A are detected during the initial check 236 and the takeoff roll continues, the alert generator 244 generates the takeoff performance alert 246 if one or more alert conditions 238B are detected during the real-time check 242 at the second position 152 of FIG. 1 to cause an operator of the aircraft 102 to reject takeoff during the takeoff roll.

In some implementations, such as when the aircraft 102 corresponds to a military aircraft or an unmanned aircraft, the automatic takeoff rejector 248 is configured to initiate performance of one or more operations to automatically (e.g., without being initiated by an operator of the aircraft 102) reject the takeoff in response to the alert generator 244 generating the takeoff performance alert 246. In an example, automatic rejection of the takeoff includes at least one of automatic adjustment of operation of the engine 214 to an idle forward thrust (e.g., via a control signal to the engine thrust controller 216), automatic deployment of the thrust reverser 218, or automatic initiation of braking of the aircraft 102 (e.g., via a control signal to the braking system 220). In other implementations in which the aircraft 102 corresponds to a commercial aircraft, the automatic takeoff rejector 248 is omitted.

According to an illustrative aspect, operation of the system 200 to monitor aircraft performance and to generate the TPA 246 is active on every flight, from the selection of takeoff thrust to liftoff. In some implementations, if the TPA 246 is not active by 80 knots groundspeed, the TPA 246 will not annunciate. If the TPA 246 has been activated but an operator elects to continue the takeoff, an audible warning or command (e.g., "Reject") will be repeatedly played out until the aircraft accelerates up to $V_1$, and visual indicators including a master warning light (MWL) will remain active until the aircraft 102 is in-air.

Figure 3:
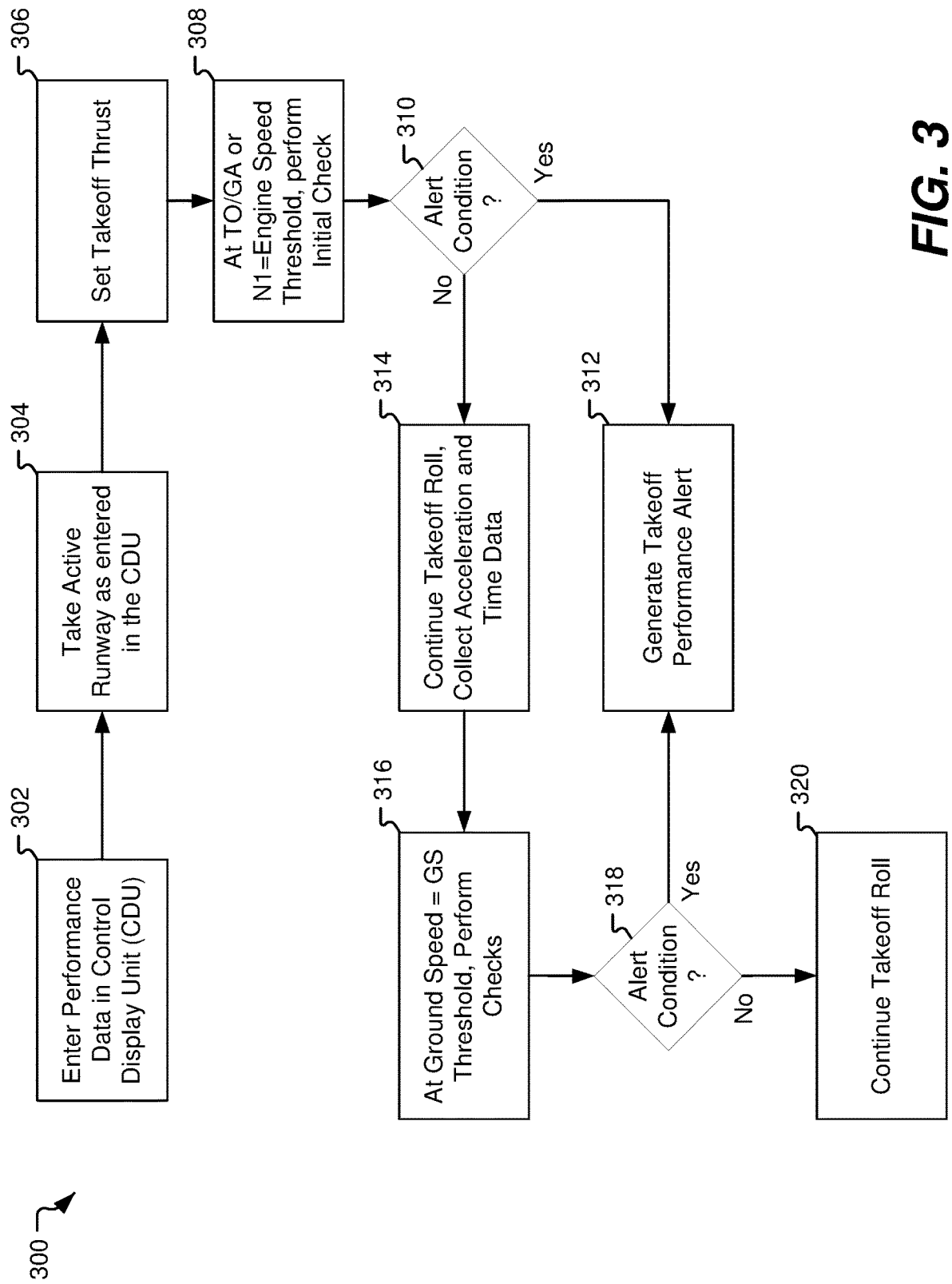
FIG. 3 is a diagram that illustrates a flow chart of a first example of a method that may be performed using the system of FIG. 2.

FIG. 3 illustrates a flow chart of a method 300 for generating a takeoff performance alert that may be performed using the system 200 of FIG. 2.

Performance data is entered in a Control Display Unit (CDU), at block 302. For example, the flight crew can enter data such as runway winds, active runway, runway length, temperature, aircraft configuration information, etc., which are received by the system 200 via the CDU 207 of FIG. 2. After all requisite information is entered and pre-flight operations are complete, the flight management function (FMF) of the aircraft 102 calculates the parameters (e.g., the initial parameters 120) for use in determining the takeoff performance alert and may publish the parameters so that a display and crew alerting (DCA) function can subscribe to and use those values, such as described in further detail with reference to FIG. 5.

The aircraft 102 takes the active runway as entered in the CDU, at block 304. The system 200 can verify that the runway taken, at block 304, matches the runway entered into the CDU. If the taken runway does not match the runway entered into the CDU, the system 200 can generate an FMC RUNWAY DISAGREE alert, and the method 300 may terminate with the aircraft 102 exiting the runway and resolving the discrepancy.

When cleared for takeoff, the crew establishes thrust, at block 306, and either selects TO/GA or manually selects takeoff thrust. The initial check 236 is performed in response to the TO/GA control 208 being actuated or in response to N1 reaching (e.g., equaling or exceeding) an engine speed threshold, such as N1=60%, at block 308. The initial check 236 can determine one or more non-normal conditions that are dependent on the runway length, such as described in FIG. 2.

At block 310, a determination is made as to whether the initial check 236 determines an alert condition, such as the alert condition 238A of FIG. 2. If an alert condition is detected, at block 310, the method 300 advances to block 312, where a takeoff performance alert 246 is generated. If no alert condition is detected, at block 310, the takeoff roll continues, and the data 254 is collected during the takeoff roll. In an example, acceleration data is collected periodically (e.g., at 250 millisecond intervals), and the acceleration data is used to determine (e.g., extrapolate) speed and position data. In other examples, the data 254 collected during the takeoff roll also includes distance data, ground speed data, or a combination thereof.

Upon the ground speed (GS) reaching (e.g., equaling or exceeding) a ground speed threshold, the method 300 includes performing one or more checks, at block 316. To illustrate, the LRU 202 performs the real-time check 242 as described in FIG. 2. The ground speed threshold can be set to a value at which the aircraft acceleration, ground speed, or both are relatively well-behaved, such as relatively linear with time (or otherwise in accordance with one or more performance models), and measured over a sufficient time period to enable a substantially accurate prediction (e.g., extrapolation) of the ground speed and position of the aircraft 102 during the remainder of the takeoff roll. In an illustrative example, the ground speed threshold is set to a value in the range of 65 knots to 75 knots, such as 70 knots.

At block 318, a determination is made as to whether the real-time check 242 determines an alert condition, such as the alert condition 238B of FIG. 2. If an alert condition is detected, at block 318, the method 300 proceeds to block 312, where a takeoff performance alert 246 is generated. If no alert condition is detected, at block 318, the takeoff roll continues, at block 320.

FIG. 4 illustrates a flow chart of another example of a method 400 for generating a takeoff performance alert that may be performed by the system 200 of FIG. 2. The method 400 includes obtaining initial values of parameters, at 402. For example, the LRU 202 obtains the initial parameters 120 at least partially based on the initial data 252, which may be received from the crew, via the CDU 207, as user the user entered data 222. The initial values include the estimated distance ($S_{V_1}$) 118 to reach the takeoff decision speed ($V_1$), the estimated all-engine go distance ($S_{GO-AE}$) 124, and the estimated distance ($S_{V_1STOP}$) 128 required to come to a stop from $V_1$, as described in FIG. 1. The initial values also include the takeoff rotation speed ($V_R$) 450 and an estimated time ($t_{VR}$) 454 to reach $V_R$.

The method 400 includes, at block 404, determining whether either the engine metric (N1) 456 has reached a first threshold engine speed ($N_{TR1}$) 458 or the TO/GA control 208 has been actuated. To illustrate, the first threshold engine speed ($N_{TR1}$) 458 may be set to a value that is large enough to ensure that the aircraft 102 is no longer taxiing and that the takeoff roll has begun. However, too large a value of the first threshold engine speed ($N_{TR1}$) 458 reduces the amount of available time for collecting data during the takeoff roll, as described below with reference to block 414. In some implementations, the first engine threshold speed ($N_{TR1}$) 458 is set to a value in the range of 55% to 65%, such as 60%. Upon N1 reaching $N_{TR1}$ or the TO/GA control 208 being actuated, the method 400 includes, at block 406, computing the initial amount of remaining runway ($RR_0$) 126 at throttles-up, and an initial check is performed, at block 408.

In some implementations, the initial check corresponds to the initial check 236 and includes evaluating a first expression (<d1>) and a second expression (<d2>). The first expression determines whether there is insufficient runway to safely reach the designated screen height. To illustrate, the first expression can be expressed as:

$$S_{GO\text{-}AE} > RR_0, \qquad \text{<d1>}$$

corresponding to determining whether the estimated all-engine go distance ($S_{GO\text{-}AE}$) 124 exceeds the initial amount of remaining runway ($RR_0$) 126. The first expression evaluates to FALSE if there is sufficient runway to reach the designated screen height 110 by the end 108 of the runway 104, and evaluates to TRUE otherwise.

The second expression determines whether the aircraft 102 is predicted to have sufficient runway to reach the takeoff decision speed ($V_1$), reject the takeoff upon reaching the takeoff decision speed ($V_1$), and after rejecting the takeoff, come to a stop before reaching the end 108 of the runway 104. For example, the second expression can compare the distance required to stop from the takeoff decision speed ($V_1$) to the distance predicted to be remaining when the aircraft has reached the takeoff decision speed ($V_1$). To illustrate, the second expression can be expressed as:

$$RR_0 - S_{V1} < S_{V1STOP}, \qquad \text{<d2>}$$

corresponding to determining whether the estimated initial amount of remaining runway ($RR_0$) 126, reduced by the first estimated distance ($S_{V1}$) 118 to reach the takeoff decision speed ($V_1$), exceeds the second estimated distance ($S_{V1STOP}$) 128 required to come to a stop after reaching the takeoff decision speed ($V_1$). The second expression evaluates to TRUE if there is insufficient runway to reach the takeoff decision speed ($V_1$) and come to a stop from the takeoff decision speed ($V_1$), and evaluates to FALSE otherwise.

A determination is made, at block 410, as to whether either of the first expression or the second expression evaluates to TRUE. If the first expression evaluates to TRUE, the second expression evaluates to TRUE, or both the first expression and the second expression evaluate to TRUE, a takeoff performance alert is generated, at block 430.

If both the first expression and the second expression evaluate to FALSE, the method 400 includes determining, at block 412, whether the ground speed (GS) 462 of the aircraft 102 has reached a first ground speed threshold ($GS_{TR1}$) 464. In some implementations, the first ground speed threshold ($GS_{TR1}$) 464 corresponds to a ground speed above which the ground speed and acceleration characteristics of the aircraft 102 are expected to be well-behaved, and therefore useful for accurate extrapolation as the aircraft 102 continues its takeoff roll. According to an aspect, the first ground speed threshold ($GS_{TR1}$) 464 is selected to have a value in the range of 45 knots to 55 knots. In a particular, non-limiting example, the first ground speed threshold ($GS_{TR1}$) 464 is 50 knots.

Upon determining that the ground speed (GS) 462 of the aircraft 102 has reached a first ground speed threshold ($GS_{TR1}$) 464, at block 412, the method 400 includes collecting the data 254 (e.g., acceleration and time data) every T milliseconds, where T represents a time interval, such as 250 milliseconds, at block 414. Collection of the data 254 continues until a determination is made, at block 416, that the ground speed (GS) 462 has reached a second ground speed threshold ($GS_{TR2}$) 468, at block 416.

In some implementations, the second ground speed threshold ($GS_{TR2}$) 468 is selected to have a large enough value to provide enough time for sufficient data collection to enable accurate predictions of future speeds and positions of the aircraft 102. However, larger values of second ground speed threshold ($GS_{TR2}$) 468 introduce longer delays before a takeoff performance alert can be determined and provided to an operator of the aircraft 102, which should occur well before the aircraft 102 reaches the takeoff decision speed ($V_1$). According to an aspect, the second ground speed threshold ($GS_{TR2}$) 468 is selected to have a value in the range of 65 knots to 80 knots. In a particular, non-limiting example, the second ground speed threshold ($GS_{TR2}$) 468 is 70 knots.

Upon determining that the ground speed (GS) 462 of the aircraft 102 has reached the second ground speed threshold ($GS_{TR2}$) 468, at block 416, the method 400 includes obtaining updated values, at block 418, based on the data 254 collected during the takeoff roll. To illustrate, the updated values correspond to the updated parameters 170 and include an estimated speed ($V_{tVR\_TPA}$) 470 that the aircraft 102 will be traveling at the point in time ($t_{VR}$) that the rotation speed ($V_R$) was originally estimated to be reached, the updated all-engine go distance ($S_{GO\text{-}TPA}$) 174, and the updated distance ($S_{VtireLimit}$) 175 to tire limit speed.

After obtaining the updated values at block 418, the method 400 includes, at block 420, performing a real-time check, such as the real-time check 242 of FIG. 2. As illustrated, the real-time check includes evaluating three expressions labelled <s1>, <d3>, and <d4>. The expression <s1> is related to whether the aircraft 102 is lagging (in time) relative to the rotation speed ($V_R$). For example, the expression <s1> determines whether the predicted speed ($V_{tVR\_TPA}$) 470 of the aircraft 102 at the rotation time ($t_{VR}$) 454 is sufficiently close to the rotation speed ($V_R$) 450, or whether the data 254 collected during the takeoff roll indicates that, at the time ($t_{VR}$) that the aircraft 102 was initially predicted to reach the rotation speed ($V_R$) 450, the aircraft 102 will instead be travelling at a significantly slower speed. To illustrate, <s1> can be expressed as:

$$V_R - V_{tVR\_TPA} > V_{TR1} \qquad \text{<s1>}$$

corresponding to determining whether a disparity ($V_R - V_{tVR\_TPA}$) 478 between the takeoff rotation speed ($V_R$) 450 and the predicted speed ($V_{tVR\_TPA}$) 470 exceeds a rotation speed disparity threshold ($V_{TR1}$) 480, such as 10 knots. Expression <s1> evaluates to TRUE if the disparity 478 exceeds the rotation speed disparity threshold ($V_{TR1}$) 480, and evaluates to FALSE otherwise.

Expression <d3> is related to whether the aircraft 102 can reach the screen height 110 before the end 108 of the runway 104. In particular, <d3> compares the updated all-engine go distance ($S_{GO-TPA}$) 174 to the estimated initial amount of remaining runway ($RR_0$) 126. To illustrate, <d3> can be expressed as:

$$S_{GO-TPA} > RR_0, \qquad <d3>$$

corresponding to determining whether the updated all-engine go distance ($S_{GO-TPA}$) 174 is greater than the estimated initial amount of remaining runway ($RR_0$) 126. Expression <d3> evaluates to TRUE if the updated all-engine go distance ($S_{GO-TPA}$) 174 exceeds the estimated initial amount of remaining runway ($RR_0$) 126, and evaluates to FALSE otherwise.

Expression <d4> is related to whether the tire limit speed will occur before the updated all-engine go distance ($S_{GO-TPA}$) 174 is reached. In particular, <d4> compares the updated all-engine go distance ($S_{GO-TPA}$) 174 to the updated distance ($S_{VtireLimit}$) 175 to tire limit speed. To illustrate, <d4> can be expressed as:

$$S_{GO-TPA} > S_{VtireLimit}, \qquad <d4>$$

corresponding to determining whether the updated all-engine go distance ($S_{GO-TPA}$) 174 is greater than the updated distance ($S_{VtireLimit}$) 175 to tire limit speed. Expression <d4> evaluates to TRUE if the updated all-engine go distance ($S_{GO-TPA}$) 174 exceeds the updated distance ($S_{VtireLimit}$) 175 to tire limit speed, and evaluates to FALSE otherwise.

A determination is made, at block 422, as to whether any of the expressions <s1>, <d3>, or <d4> evaluates to TRUE. If the expression <s1> and either of the expressions <d3> or <d4> elevate to TRUE, a takeoff performance alert is generated, at block 430. Otherwise, the performance of the aircraft 102 during the takeoff roll is evaluated as satisfactory in comparison to the initial estimates, and the takeoff roll continues without generating a takeoff performance alert, at block 432. In an alternative implementation, the determination to generate the takeoff performance alert can be based on determining that any one or more of the expressions <s1>, <d3>, or <d4> evaluates to TRUE.

Thus, the method 400 enables enhanced monitoring of the performance upon initiation of, and during, the takeoff roll and the capability to generate a takeoff performance alert in response to initial checks and further in response to predicted aircraft performance based on real-time speed and acceleration data collected during the takeoff roll.

Although the method 400 illustrates evaluation of the expressions <d1> and <d2> as part of the initial check, in other implementations performance of the initial check may omit evaluation either of <d1> or <d2>. To illustrate, if one of the expressions <d1> or <d2> is evaluated as TRUE, the initial check can be terminated and an alert generated without completing the evaluation of the other of <d1> or <d2>. Similarly, in some implementations, performance of the real-time check may omit evaluation of one or more of the expressions <s1>, <d3>, or <d4>. The expressions <d1>, <d2>, <s1>, <d3>, and <d4> are provided as illustrative examples, and in other implementations one or more of <d1>, <d2>, <s1>, <d3>, or <d4> can be replaced with one or more logically equivalent expressions.

Although the method 400 illustrates that the real time check incudes the expressions <s1>, <d3>, and <d4>, in other implementations one or more other expressions can be evaluated as part of the real time check in place of, or in addition to, one or more of expressions <s1>, <d3>, and <d4>. In a first example, the real time check evaluates whether the aircraft 102 is lagging (in space) relative to the liftoff speed ($V_{LO}$), such as by evaluating the expression $S_{SF}*S_{LO} \leq S_{VLO\_TPA}$, corresponding to determining whether the initial estimated distance ($S_{LO}$) 122 to achieve the liftoff speed ($V_{LO}$), adjusted by a scaling factor ($S_{SF}$) (e.g., 1.15), is less than or equal to the updated estimated distance ($S_{VLO\_TPA}$) 172 to achieve the liftoff speed ($V_{LO}$). In a second example, the real time check evaluates whether there will be sufficient runway for liftoff, such as by evaluating the expression $S_{VLO@GS2}+S_{TR2}>RR_{GS2}$, corresponding to determining whether a sum of the remaining distance ($S_{VLO@GS2}$) 180 to achieve the liftoff speed ($V_{LO}$) and a threshold distance ($S_{TR2}$) exceeds the updated amount of remaining runway ($RR_{GS2}$) 176. In a third example, the real time check evaluates whether there will be sufficient runway to stop upon reaching the takeoff decision speed ($V_1$), such as by evaluating the expression ($RR_{GS2}-S_{V1@GS2})<S_{V1STOP}$, corresponding to determining whether a difference between the updated amount of remaining runway ($RR_{GS2}$) 176 and the remaining distance ($S_{V1@GS2}$) 168 to achieve the takeoff decision speed ($V_1$) is less than the estimated distance ($S_{V1STOP}$) 128 required to come to a stop after reaching the takeoff decision speed ($V_1$).

Figure 5:
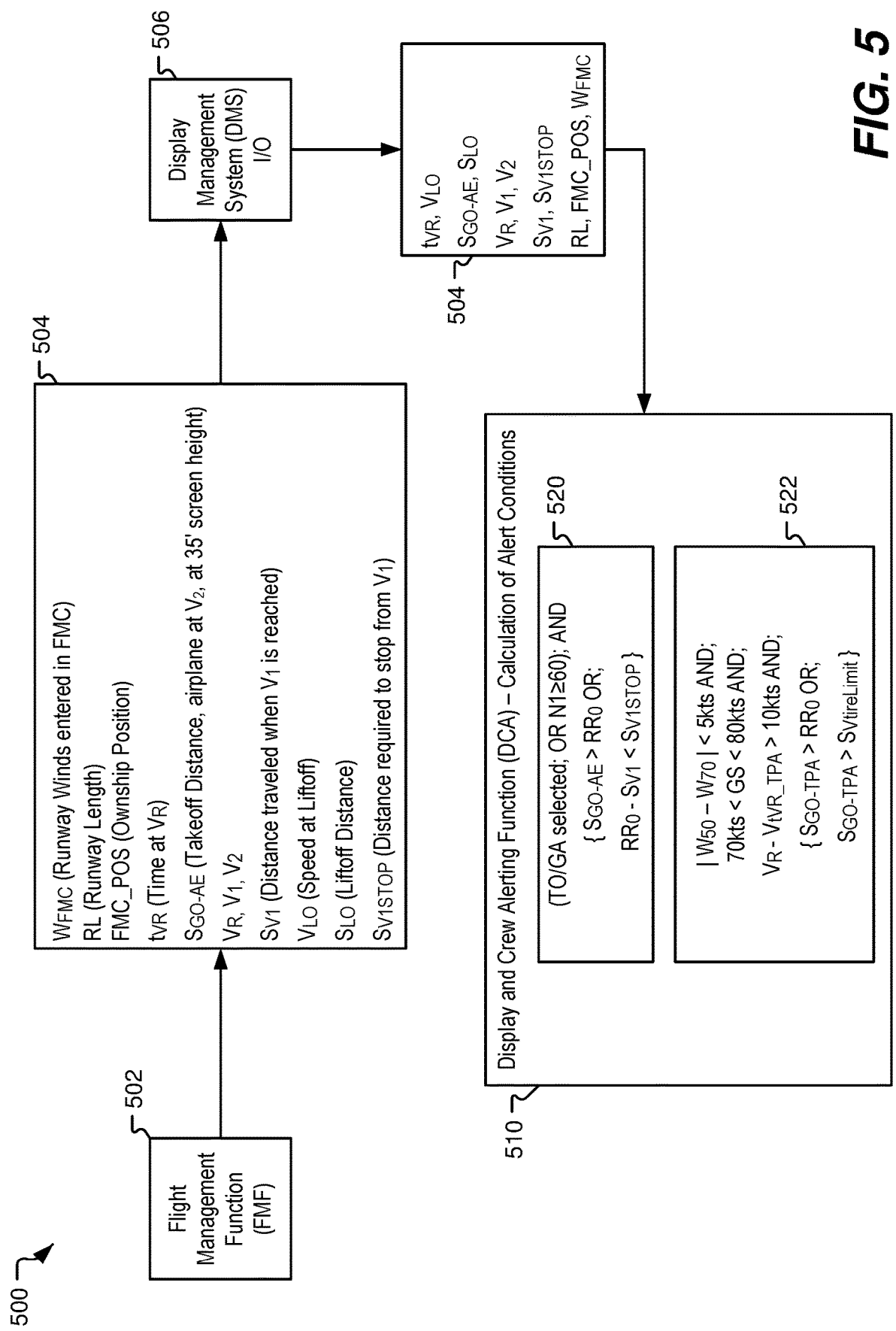
FIG. 5 is a diagram that illustrates an example of operations that may be performed by the system of FIG. 2.

FIG. 5 illustrates an example of operations 500 that may be performed by the system 200 of FIG. 2. A flight management function (FMF) 502 provides (e.g., receives or calculates) various takeoff parameters and data 504. As illustrated, the takeoff parameters and data 504 includes runway winds ($W_{FMC}$) (e.g., the headwind or tailwind component, along the runway) entered into an FMC, runway length (RL), ownship position (RMC_POS), $t_{VR}$ 454, $S_{GO-AE}$ 124 (e.g., at 35-foot screen height), $V_R$ 450, $V_1$, $V_2$, $S_{V1}$ 118, $V_{LO}$ (e.g., speed at liftoff), $S_{LO}$ 122, and $S_{V1STOP}$ 128.

The takeoff parameters and data 504 are provided, via a display management system (DMS) input/output interface (I/O) 506, to a display and crew alerting function (DCA) 510 for calculation of alert conditions. A first set of alert conditions 520 includes the expression: (TO/GA selected OR N1≥60) AND {($S_{GO-AE}>RR_0$) OR ($RR_0-S_{V1}<S_{V1STOP}$)}, corresponding to the determination of block 404 and the initial check of block 408 of FIG. 4, implemented using $N_{TR1}$=60. A takeoff performance alert is generated if the first set of alert conditions 520 evaluates to TRUE.

A second set of alert conditions 522 includes the expression: (|$W_{50}-W_{70}$|<5 kts) AND (70 kts<GS<80 kts) AND ($V_R-V_{tVR\_TPA}$>10 kts) AND {($S_{GO-TPA}>RR_0$) OR ($S_{GO-TPA}>S_{VtireLimit}$)}. The expression (|$W_{50}-W_{70}$|<5 kts) corresponds to a check that the absolute value of the difference between measured windspeed when groundspeed of the aircraft 102 is at 50 knots (e.g., $GS_{TR1}$=50 knots) and measured windspeed when the groundspeed of the aircraft is at 70 knots (e.g., $GS_{TR2}$=70 knots) does not exceed 5 knots. The expression (70 kts<GS<80 kts) corresponds to a check that the groundspeed of the aircraft 102 is greater than 70 knots and less than 80 knots (e.g., upon completion of the data collection at block 414 of FIG. 4). The expression ($V_R-V_{tVR\_TPA}$>10 kts) corresponds to the expression <s1>, the expression ($S_{GO-TPA}>RR_0$) corresponds to the expression <d3>, and the expression ($S_{GO-TPA}>S_{VtireLimit}$) corresponds to the expression <d4>. A takeoff performance alert is generated if the second set of alert conditions 522 evaluates to TRUE.

In a particular implementation, the initial check computer 234 of FIG. 2 performs the checks included in the first set of alert conditions 520, including evaluating <d1> and <d2>, using the all-engine takeoff parameters calculated by the FMF 502 as well as information about the departure runway at the time takeoff thrust is selected. These checks are independent of real-time acceleration.

In a particular implementation, the real-time check computer 240 of FIG. 2 performs the checks included in the second set of alert conditions 522, including evaluating <s1>, <d3>, and <d4> based on real-time aircraft performance. For example, True Airspeed (TAS) at $t_{VR}$ cannot be predicted until some acceleration, distance, groundspeed (GS), and time data are collected (and/or computed based on collected data). The LRU 202 collects this data up until GS=70 knots (e.g., in the data 254 collected during the takeoff roll). A comparison of the wind values at GS=50 knots and GS=70 knots is performed by taking the difference of TAS and GS measured at those stages of the takeoff roll. By conditioning the second set of alert conditions 522 on the difference being less than 5 knots (e.g., $|W_{50}-W_{70}|<5$ kts), a possibility of inaccurate generation of a takeoff performance alert due to gusting conditions is reduced or eliminated.

In some implementations, real-time distance parameters, such as $S_{GO\text{-}TPA}$ and $S_{VtireLimit}$, are determined using a first principles equation of motion:

$$d = d_0 + vt + (\tfrac{1}{2})at^2,$$

where $d_0$ represents the distance at the previous time interval, v represents the TAS in feet per second (ft/s), a represents the acceleration in f/s$^2$, and t represents time in seconds. The distance d can be computed during each measurement time period (e.g., every T ms as illustrated at block 414 of FIG. 2).

In terms of indices representing such time intervals, the distance can be approximated as:

$$d_i = d_{i-1} + v_{i-1}(t_i - t_{i-1}) + (\tfrac{1}{2})a_{i-1}(t_i - t_{i-1})^2,$$

where $d_i$ represents the distance traveled at the current time interval i; $d_{i-1}$ represents the distance traveled at the previous time interval; $v_{i-1}$ represents the extrapolated velocity at the previous time interval; $t_i$ represents the time at the current time interval; $t_{i-1}$ represents the time at the previous time interval, and $a_{i-1}$ is the extrapolated acceleration at the previous time interval.

In some implementations, the GS is provided by airplane sensors and the TAS is calculated as: TAS=GS+Windspeed. TAS is derived from GS because of potential fluctuations based on instantaneous Windspeed. The average wind ($W_{avg}$) is calculated during the evaluation period (e.g., between 50 and 70 knots GS) and, at 70 knots GS, $W_{avg}$ is added to the GS to calculate the TAS. The predicted TAS—$V_{tVR\_TPA}$—can be calculated as determined by: $v=v_0+at$, which can be expressed in terms of indices representing intervals of time as:

$$v_i = v_{i-1} + a_{i-1}(t_i - t_{i-1}).$$

According to an aspect, in the above equations for distance, velocity is converted from knots to ft/s and, in the equation for TAS, acceleration is converted based on a conversion from ft/s to knots. In both cases, the conversion factor 1.6878 ft/s per knots can be used.

Figure 6:
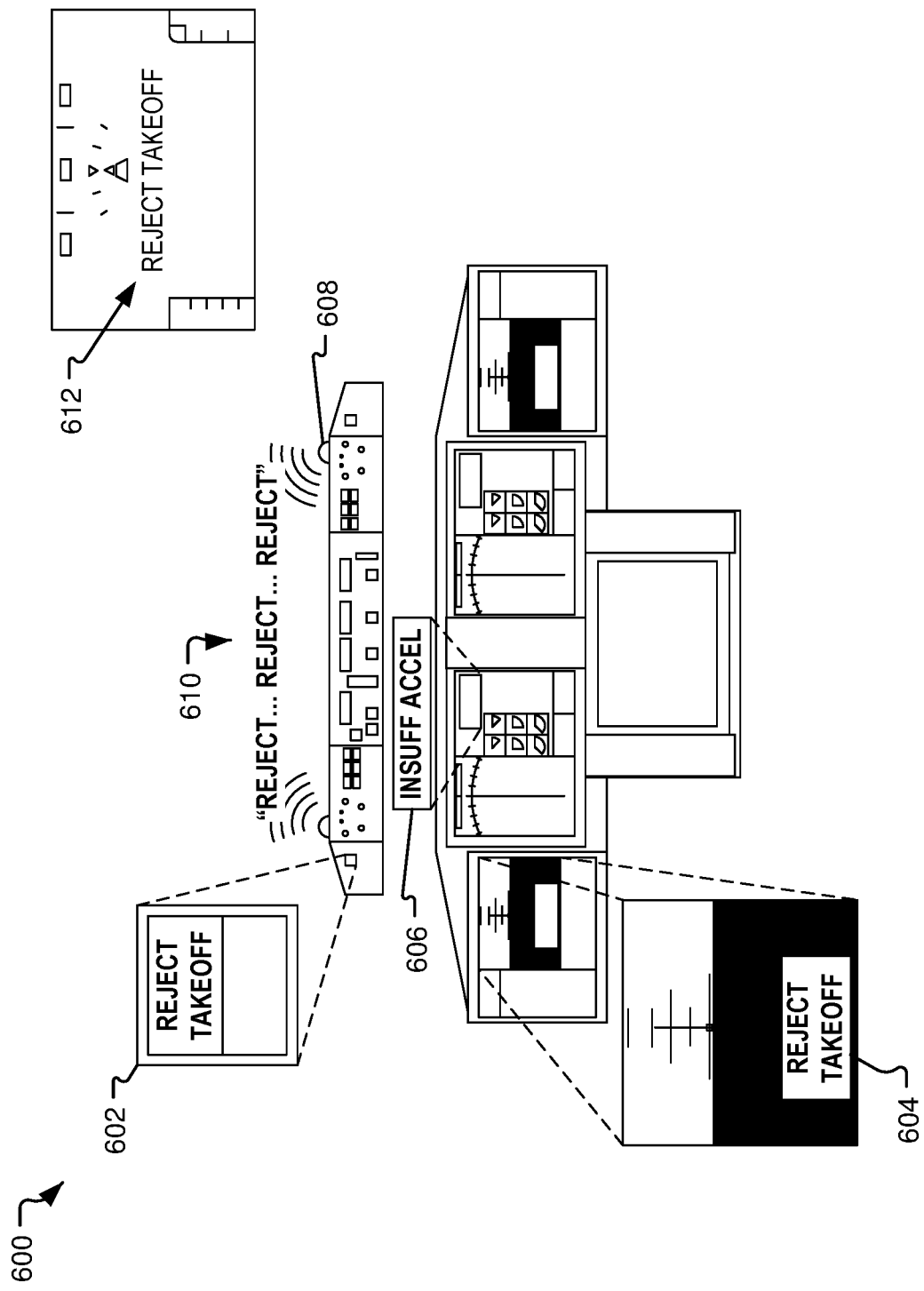
FIG. 6 is a diagram that illustrates an example of takeoff performance alert indicators that may be generated by the system of FIG. 2.

FIG. 6 is a diagram 600 illustrating an example of takeoff performance alert indicators that may be generated by the system 200 of FIG. 2. Display devices that include visual takeoff performance alert indicators are illustrated as a master warning light 602 on a flight deck panel, a PFD including an indicator 604, an EICAS display including an indicator 606, and a HUD including an indicator 612, each of which indicates the takeoff performance alert 246 and can correspond to an instance of the visual indicator 260 of FIG. 2. An audible indicator includes a repeated command 610 ("Reject") played out via one or more loudspeakers 608, which can correspond to the audible command 262 played out via the one or more loudspeakers 212 of FIG. 2. Although FIG. 6 depicts four visual indicators and one audible indicator, in other implementations one or more other audible, visual, or other types of indicators (e.g., haptic) can be used in place of, or in addition to, one or more of the illustrated indicators to provide a takeoff performance alert to an operator. As an example, each of the visual indicators 602, 604, 606 can be duplicated and displayed on both sides of the fight deck panel. Thus, the alert indicators illustrated in the diagram 600 are to be understood as a non-limiting, illustrative example.

Figure 7:
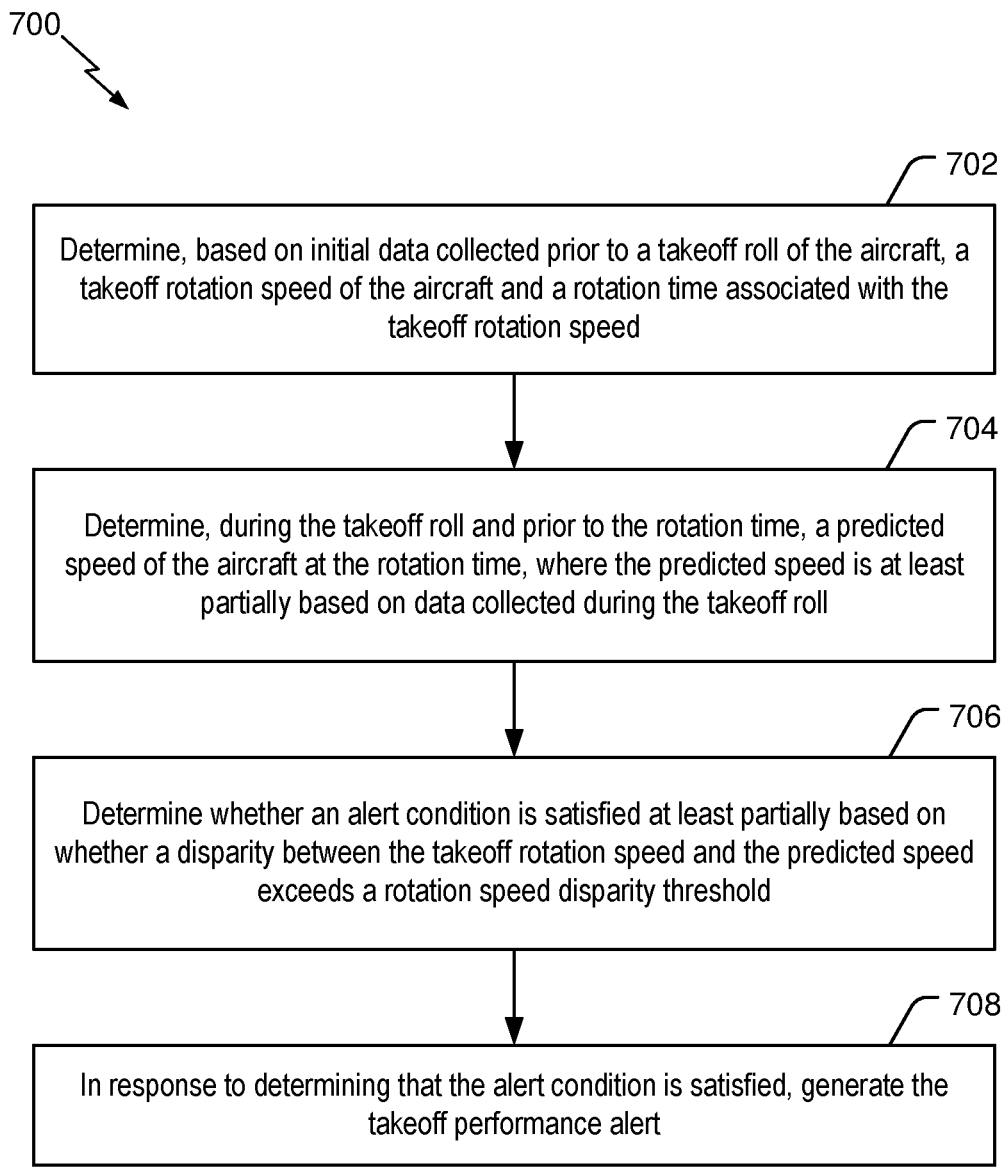
FIG. 7 is a diagram that illustrates a flow chart of a first example of a method for generating a takeoff performance alert during a takeoff associated with an aircraft.

FIG. 7 illustrates a flow chart of a method 700 for generating a takeoff performance alert during a takeoff associated with an aircraft. In a particular implementation, the method 700 is performed by the LRU 202 of FIG. 2.

The method 700 includes, at block 702, determining, based on initial data collected prior to a takeoff roll of the aircraft, a takeoff rotation speed of the aircraft and a rotation time associated with the takeoff rotation speed 450. For example, the LRU 202 determines the takeoff rotation speed ($V_R$) 450 and the rotation time ($t_{VR}$) 454 based on the initial data 252. In some implementations, the initial data is received as user-entered data at an interface to a flight management computer prior to the takeoff roll, such as the user entered data 222 at the CDU 207.

The method 700 includes, at block 704, determining, during the takeoff roll and prior to the rotation time, a predicted speed of the aircraft at the rotation time, where the predicted speed is at least partially based on data collected during the takeoff roll. For example, the LRU 202 computes the predicted speed ($V_{tVR\_TPA}$) 470 at the rotation time ($t_{VR}$) 454 based on the data 254 collected during the takeoff roll. In some implementations, collection of the data during the takeoff roll is initiated responsive to the aircraft reaching a first speed, and determination of the predicted speed is performed responsive to the aircraft reaching a second speed that is greater than the first speed. In an example, the LRU 202 initiates collection of the data 254 in response to the aircraft 102 reaching the first ground speed threshold ($GS_{TR1}$) 464, and computes the predicted speed ($V_{tVR\_TPA}$) 470 at the rotation time ($t_{VR}$) 454 in response to the aircraft 102 reaching the second ground speed threshold ($GS_{TR2}$) 468.

The method 700 includes, at block 706, determining whether an alert condition is satisfied at least partially based on whether a disparity between the takeoff rotation speed and the predicted speed exceeds a rotation speed disparity threshold. In an example, the LRU 202 determines whether the alert condition 238B is satisfied at least partially based on whether the disparity ($V_R - V_{tVR\_TPA}$) 478 between the takeoff rotation speed ($V_R$) 450 and the predicted speed ($V_{tVR\_TPA}$) 470 exceeds the rotation speed disparity threshold ($V_{TR1}$) 480.

The method 700 includes, at block 708, in response to determining that the alert condition is satisfied, generating the takeoff performance alert. For example, the alert generator 244 of the LRU 202 generates the takeoff performance alert 246 in response to determining that the alert condition 238B is satisfied.

Figure 8:
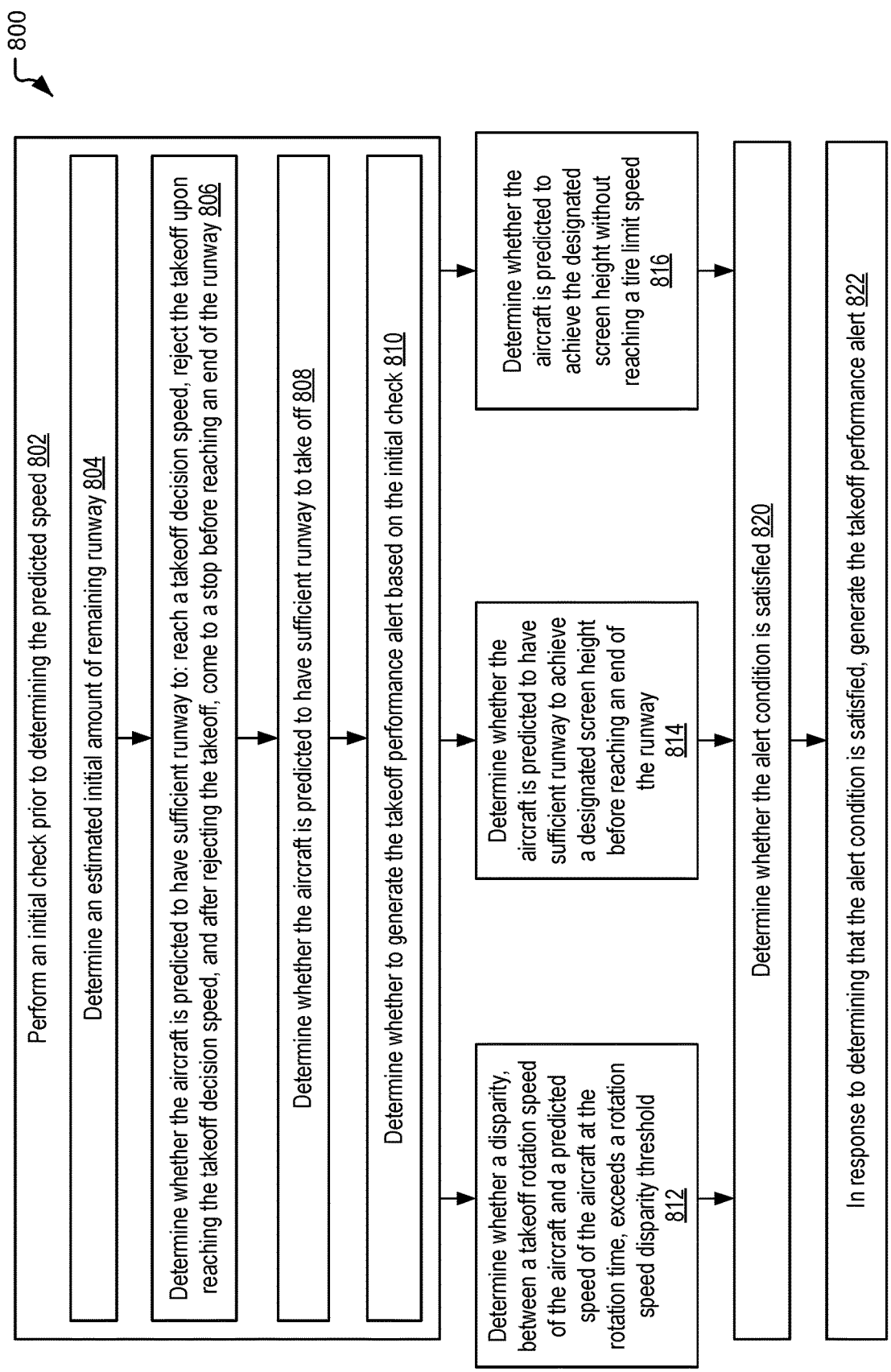
FIG. 8 is a diagram that illustrates a flow chart of a second example of a method for generating a takeoff performance alert during a takeoff associated with an aircraft.

FIG. 8 illustrates a flow chart of a method 800 for generating a takeoff performance alert during a takeoff associated with an aircraft. In a particular implementation, the method 800 is performed by the LRU 202 of FIG. 2.

The method 800 includes, at block 802 and prior to the determining of the initial check described in the method 700 of FIG. 7, performing an initial check, such as the initial check 236. Performing the initial check includes, at block 804, determining an estimated initial amount of remaining runway, such as the estimated amount of remaining runway ($RR_O$) 126, and determining whether the aircraft is predicted to have sufficient runway to: reach a takeoff decision speed ($V_1$), reject the takeoff upon reaching the takeoff decision speed ($V_1$), and after rejecting the takeoff, come to a stop before reaching an end of the runway, at block 806. Performing the initial check also includes determining whether the aircraft is predicted to have enough runway to take off, at block 808, and determining whether to generate the takeoff performance alert based on the initial check, at 810. An example of performing of the initial check is described in further detail with reference to FIG. 9.

After performing the initial check, and during the takeoff roll, a real-time check can be performed based on evaluating multiple conditions, illustrated at blocks 812-816. To illustrate, the method 800 includes, at block 812, determining whether a disparity between the takeoff rotation speed and the predicted speed of the aircraft at the rotation time exceeds a rotation speed disparity threshold, such as described previously in the method 700. In an example, the LRU 202 determines whether the disparity ($V_R - V_{tVR\_TPA}$) 478 between the takeoff rotation speed ($V_R$) 450 and the predicted speed ($V_{tVR\_TPA}$) 470 exceeds the rotation speed disparity threshold ($V_{TR1}$) 480.

At block 814, the method 800 includes determining whether the aircraft is predicted to have sufficient runway to achieve a designated screen height (e.g., the screen height 110) before reaching an end of the runway. At block 816, the method 800 includes determining whether the aircraft is predicted to achieve the designated screen height without reaching a tire limit speed.

The method 800 includes, at block 820, determining whether the alert condition is satisfied. In an illustrative example, determining whether the alert condition is satisfied is based on: whether the disparity between the takeoff rotation speed and the predicted speed of the aircraft at the rotation time exceeds a rotation speed disparity threshold, whether the aircraft is predicted to have sufficient runway to achieve the designated screen height before reaching an end of the runway, and whether the aircraft is predicted to achieve the designated screen height without reaching a tire limit speed, corresponding to the determinations made at blocks 812-816.

According to some implementations, the alert condition is determined to be satisfied in response to both: (A) the disparity between the takeoff rotation speed and the predicted speed of the aircraft at the rotation time exceeding the rotation speed disparity threshold; and (B) the aircraft being predicted to not have sufficient runway to achieve the designated screen height before reaching an end of the runway. According to another aspect, the alert condition is determined to be satisfied in response to both: (A) the disparity between the takeoff rotation speed and the predicted speed of the aircraft at the rotation time exceeding the rotation speed disparity threshold; and (C) the aircraft being predicted to reach the tire speed limit before achieving the designated screen height.

The method 800 also includes, in response to determining that the alert condition is satisfied, generating the takeoff performance alert, at block 822. For example, the alert generator 244 of the LRU 202 generates the takeoff performance alert 246.

Figure 9:
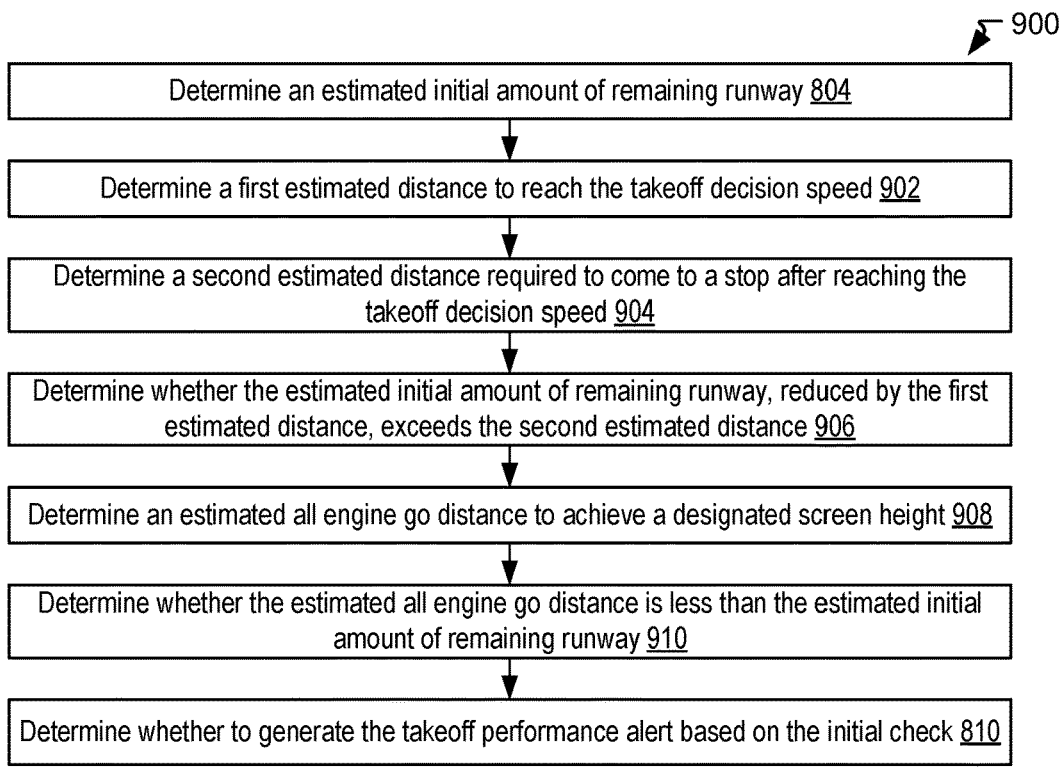
FIG. 9 is a diagram that illustrates a flow chart of an example of a method for generating a takeoff performance alert based on an initial check during a takeoff associated with an aircraft.

FIG. 9 illustrates a flow chart of a method 900 for generating a takeoff performance alert based on an initial check during a takeoff associated with an aircraft. In a particular implementation, the method 900 corresponds to, or is included in, performing the initial check at block 802 of FIG. 8. For example, the method 900 includes determining an initial amount of remaining runway, at block 804.

The method 900 includes determining a first estimated distance (e.g., $S_{V1}$ 118) to reach the takeoff decision speed ($V_1$), at block 902. The method 900 also includes determining a second estimated distance (e.g., $S_{V1STOP}$ 128) required to come to a stop after reaching the takeoff decision speed ($V_1$), at block 904. The method 900 further includes determining whether the estimated initial amount of remaining runway (e.g., $RR_O$ 126), reduced by the first estimated distance (e.g., $S_{V1}$ 118), exceeds the second estimated distance (e.g., $S_{V1STOP}$ 128), at block 906. In a particular implementation, blocks 902, 904, and 906 are performed as part of determining whether the aircraft is predicted to have sufficient runway to reach the takeoff decision speed, reject the takeoff, and come to a stop, of block 806 of FIG. 8.

The method 900 includes determining an estimated all-engine go distance (e.g., $S_{GO-AE}$ 124) to achieve a designated screen height, at block 908, and determining whether the estimated all-engine go distance is less than the estimated initial amount of remaining runway, at block 910. In a particular implementation, blocks 908 and 910 are performed as part of determining whether the aircraft is predicted to have sufficient runway to take off, of block 808 of FIG. 8.

The method 900 also includes determining whether to generate the takeoff performance alert based on the initial check, at block 810. For example, a determination is made to generate the takeoff performance alert in response to the estimated initial amount of remaining runway, reduced by the first estimated distance, exceeding the second estimated distance. As another example, a determination is made to generate the takeoff performance alert in response to the estimated all-engine go distance being less than the estimated initial amount of remaining runway.

Figure 10:
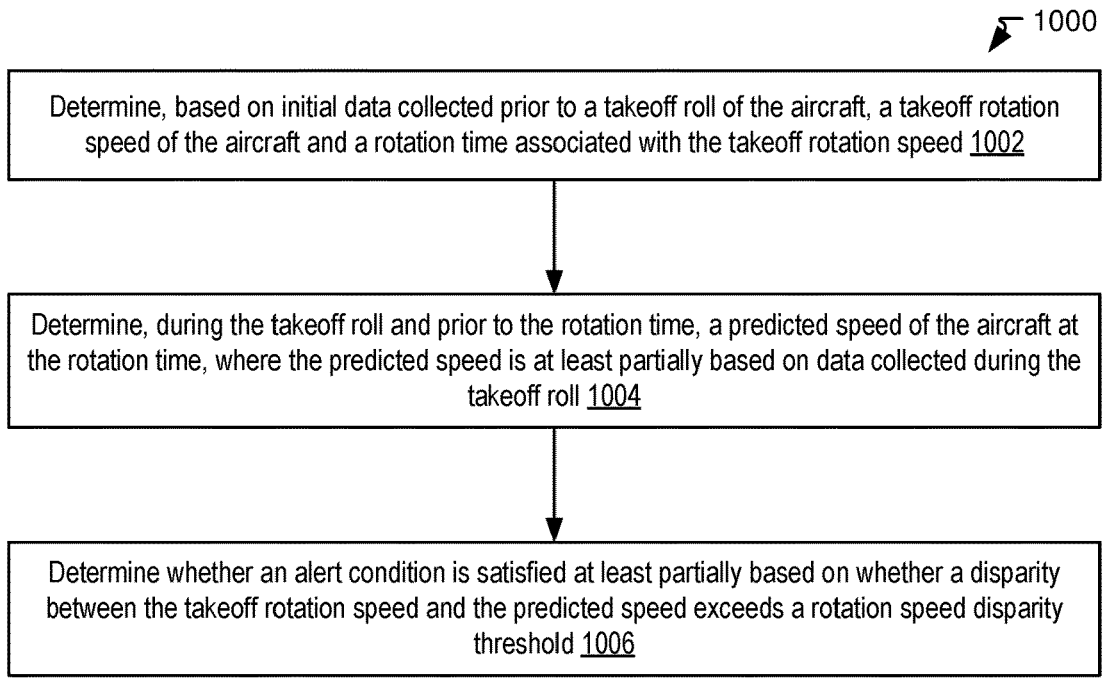
FIG. 10 is a diagram that illustrates a flow chart of an example of a method for generating a takeoff performance alert based on a predicted speed of an aircraft at a rotation time during a takeoff associated with an aircraft.

FIG. 10 illustrates a flow chart of a method 1000 for generating a takeoff performance alert based on a predicted speed of an aircraft at a rotation time during a takeoff. In a particular implementation, the method 1000 corresponds to, or is included in, determining whether a disparity between the takeoff rotation speed and the predicted speed of the aircraft at the rotation time exceeds a rotation speed disparity threshold, at block 812 of FIG. 8.

The method 1000 includes determining, based on initial data collected prior to a takeoff roll of the aircraft, a takeoff rotation speed (e.g., $V_R$ 450) of the aircraft and a rotation time (e.g., $t_{VR}$ 454) associated with the takeoff rotation speed, at block 1002. The method 1000 also includes, at block 1004, determining, during the takeoff roll and prior to the rotation time, a predicted speed (e.g., $V_{tVR\_TPA}$ 470) of the aircraft at the rotation time, where the predicted speed is at least partially based on data collected during the takeoff roll (e.g., the data 254).

The method 1000 includes, at block 1006, determining whether an alert condition is satisfied at least partially based on whether a disparity (e.g., ($V_R - V_{tVR\_TPA}$) 478) between the takeoff rotation speed (e.g., $V_R$ 450) and the predicted speed (e.g., $V_{tVR\_TPA}$ 470) exceeds a rotation speed disparity threshold (e.g., $V_{TR1}$ 480). For example, the real-time check computer 240 can evaluate the expression <s1> of FIG. 4. In some implementations, the method 1000 also includes generating the takeoff performance alert in response to determining that the alert condition is satisfied.

FIG. 11 illustrates a flow chart of a method 1100 for generating a takeoff performance alert based on an all-engine go distance to achieve a designated screen height during a takeoff of an aircraft. In a particular implementation, the method 1100 corresponds to, or is included in, determining whether the aircraft is predicted to have sufficient runway to achieve the designated screen height before reaching an end of the runway, at block 814 of FIG. 8.

The method 1100 incudes determining, at least partially based on initial data (e.g. the initial data 252) collected prior to the takeoff roll, an estimated initial amount of remaining runway (e.g., $RR_O$ 126), at block 1102. The method 1100 also includes determining, at least partially based on data (e.g., the data 254) collected during the takeoff roll, an updated all-engine go distance (e.g., $S_{GO-TPA}$ 174) to achieve a designated screen height (e.g., the screen height 110), at block 1104.

The method 1100 includes determining whether the updated all-engine go distance to achieve the designated screen height is greater than the estimated initial amount of remaining runway, at 1106. For example, the real-time check computer 240 can evaluate the expression <d3> of FIG. 4. In some implementations, the method 1100 includes determining that an alert condition is satisfied in response to the updated all-engine go distance to achieve the designated screen height being greater than the estimated initial amount of remaining runway.

FIG. 12 illustrates a method 1200 for generating a takeoff performance alert based on an all-engine go distance to achieve a designated screen height. In a particular implementation, the method 1200 corresponds to, or is included in, determining whether the aircraft is predicted to achieve the designated screen height without reaching a tire limit speed, at block 816 of FIG. 8.

The method 1200 includes determining, at least partially based on data (e.g., the data 254) collected during the takeoff roll, an updated all-engine go distance (e.g., $S_{GO-TPA}$ 174) to achieve a designated screen height, at block 1202. The method 1200 also includes determining, at least partially based on data (e.g., the updated data 254) collected during the takeoff roll, an updated distance (e.g., $S_{VtireLimit}$ 175) to reach a tire limit speed at least partially based on the data collected during the takeoff roll, an updated amount of remaining runway (e.g., $RR_{GS2}$ 176), at block 1204.

The method 1200 includes determining whether a sum of the remaining distance to achieve the liftoff speed and a threshold distance (e.g., $S_{TR2}$ 484) exceeds the updated amount of remaining runway, at block 1206. For example, the real-time check computer 240 can evaluate the expression <d4> of FIG. 4. In some implementations, the method 1200 includes determining that an alert condition is satisfied in response to the updated all-engine go distance being greater than the updated distance to reach the tire limit speed.

FIG. 13 illustrates a method 1300 for generating a takeoff performance alert and automatically rejecting a takeoff of an aircraft. In a particular implementation, the method 1300 corresponds to, or is performed as part of, generating the takeoff performance alert in any of the methods of FIGS. 7-12.

The method 1300 includes at least one of: displaying a visual indicator (e.g., the visual indicator 260 of FIG. 2) instructing an operator of the aircraft to reject takeoff, at block 1302, or generating an audible command (e.g., the audible command 262) instructing the operator of the aircraft to reject takeoff, at block 1304.

If the aircraft includes at least one of a military aircraft or an unmanned aircraft, the method 1300 also includes automatically rejecting takeoff in response to generation of the takeoff performance alert, at block 1306. For example, the automatic takeoff rejector 248 can reject takeoff in response to generation of the takeoff performance alert 246. In a particular implementation, automatically rejecting the takeoff includes at least one of: automatically adjusting operation of an engine to an idle forward thrust, automatically deploying a thrust reverser, or automatically initiating braking of the aircraft, such as described further with reference to FIG. 14.

FIG. 14 illustrates a method 1400 for automatically rejecting a takeoff of a military or unmanned aircraft in response to generation of a takeoff performance alert. In a particular implementation, the method 1400 corresponds to, or is performed as part of automatically rejecting takeoff in response to generation of the takeoff performance alert of block 1306 of FIG. 13.

The method 1400 includes automatically adjusting operation of an engine to an idle forward thrust, at block 1402. For example, the automatic takeoff rejector 248 can cause the engine thrust controller 216 to adjust the engine 214 to an idle forward thrust. The method 1400 includes automatically deploying a thrust reverser, at block 1404. For example, the automatic takeoff rejector 248 can cause the engine thrust controller 216 to deploy the thrust reverser 218. The method 1400 also includes automatically initiating braking of the aircraft, at block 1406. For example, the automatic takeoff rejector 248 can engage the braking system 220, Referring to FIGS. 15 and 16, examples of the disclosure are described in the context of an aircraft manufacturing and service method 1500 as illustrated by the flow chart of FIG. 15 and the aircraft 102 as illustrated by the block diagram of FIG. 16.

Figure 15:
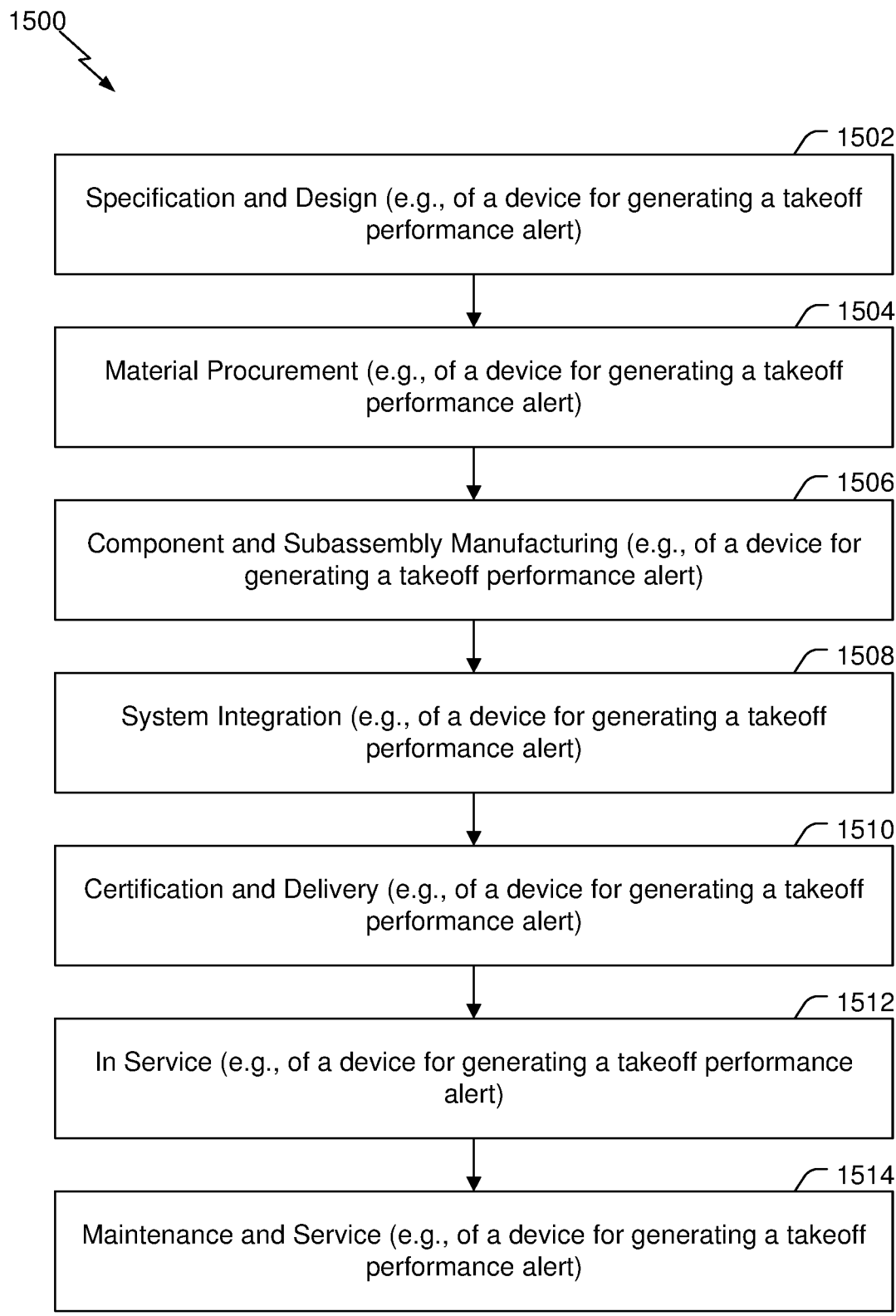
FIG. 15 is a flow chart of a method associated with an aircraft takeoff performance alert system.

Referring to FIG. 15, a flowchart of an illustrative example of a method associated with a takeoff performance alert system (e.g., the LRU 202) is shown and designated 1500. During pre-production, the exemplary method 1500 includes, at block 1502, specification and design of an aircraft, such as the aircraft 102. During the specification and design of the aircraft, the method 1500 includes specifying the LRU 202, the engine 214, the display device 210, the loudspeaker(s) 212, the engine thrust controller 216, the thrust reverser 218, the braking system 220, the sensor(s) 204, and the user interface 206. At block 1504, the method 1500 includes material procurement. For example, the method 1500 may include procuring materials (such as materials for the LRU 202, the engine 214, the display device 210, the loudspeaker(s) 212, the engine thrust controller 216, the thrust reverser 218, the braking system 220, the sensor(s) 204, and the user interface 206) for the takeoff performance alert system.

During production, the method 1500 includes, at block 1506, component and subassembly manufacturing and, at block 1508, system integration of the aircraft. The method 1500 may include component and subassembly manufacturing (e.g., the LRU 202, the engine 214, the display device 210, the loudspeaker(s) 212, the engine thrust controller 216, the thrust reverser 218, the braking system 220, the sensor(s) 204, and the user interface 206) of the takeoff performance alert system and system integration (e.g., coupling the components) of the takeoff performance alert system. At block 1510, the method 1500 includes certification and delivery of the aircraft and, at block 1512, placing the aircraft in service. In some implementations, certification and delivery includes certifying the takeoff performance alert system. Placing the aircraft in service may also include placing takeoff performance alert system in service. While in service, the aircraft may be scheduled for routine maintenance and service (which may also include modification, reconfiguration, refurbishment, and so on). At block 1514, the method 1500 includes performing maintenance and service on the aircraft. The method 1500 may include performing maintenance and service on the takeoff performance alert system. For example, maintenance and service of the sensor data storage and analysis system may include replacing one or more of the LRU 202, the engine 214, the display device 210, the loudspeaker(s) 212, the engine thrust controller 216, the thrust reverser 218, the braking system 220, the sensor(s) 204, and the user interface 206.

Figure 16:
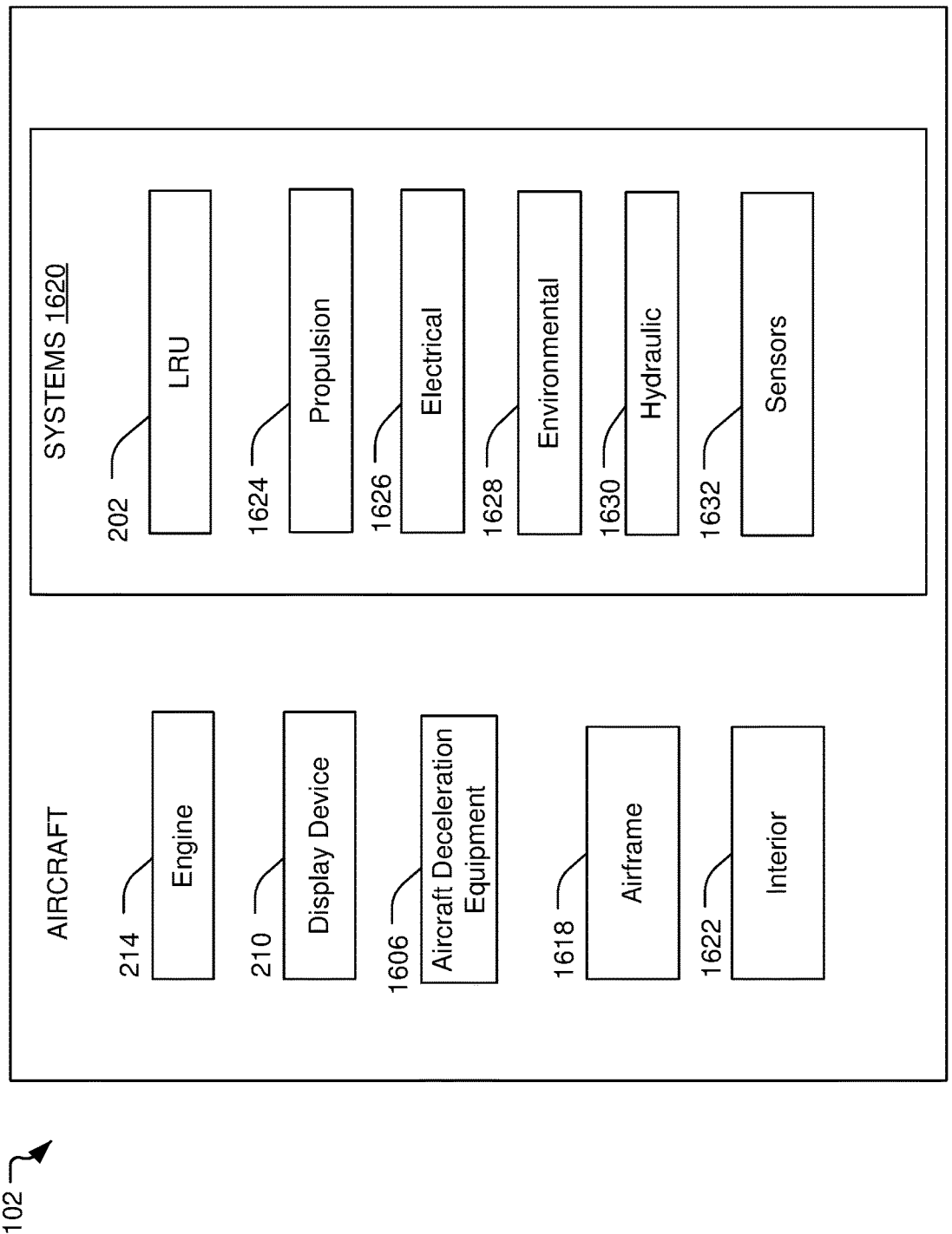
FIG. 16 is a block diagram of an aircraft including a takeoff performance alert system.

Referring to FIG. 16, a block diagram of an illustrative implementation of the aircraft 102 that includes components of a takeoff performance alert system is shown. In at least one implementation, the aircraft 102 is produced by at least a portion of the method 1500 of FIG. 15. As shown in FIG. 16, the aircraft 102 includes an airframe 1618, the engine 214, the display device 210, aircraft deceleration equipment 1606 (e.g., the engine thrust controller 216, the thrust reverser 218, the braking system 220, or a combination thereof), a plurality of systems 1620, and an interior 1622. Examples of the plurality of systems 1620 include one or more of a propulsion system 1624, an electrical system 1626, an environmental system 1628, a hydraulic system 1630, and a sensor system 1632. The sensor system 1632 includes one or more sensors onboard the aircraft 102 and that are configured to generate sensor data during operation of the aircraft 102, such as the one or more sensors 204. The sensor data can indicate one or more parameter values of at least one operational parameter measured by the one or more sensors and one or more timestamps associated with the one or more parameter values.

The aircraft 102 also includes the LRU 202 including the parameter generator 230, the takeoff roll detector 232, the initial check computer 234, the real-time check computer 240, the alert generator 244, the automatic takeoff rejector 248, the memory 250, or a combination thereof.

Any number of other systems may be included in the aircraft 102. Although an aerospace example is shown, the present disclosure may be applied to other industries. For example, the LRU 202 may be used onboard a manned or unmanned aircraft (such as a satellite, a watercraft, or a land-based vehicle).

Apparatus and methods included herein may be employed during any one or more of the stages of the method 1500 of FIG. 15. For example, components or subassemblies corresponding to production process 1508 may be fabricated or manufactured in a manner similar to components or subassemblies produced while the aircraft 102 is in service, at block 1512 for example and without limitation. Also, one or more apparatus implementations, method implementations, or a combination thereof may be utilized during the production stages (e.g., stages 1502-1510 of the method 1500), for example, by substantially expediting assembly of or reducing the cost of the aircraft 102. Similarly, one or more of apparatus implementations, method implementations, or a combination thereof may be utilized while the aircraft 102 is in service, such as during maintenance and service at block 1514 for example and without limitation.

Figure 17:
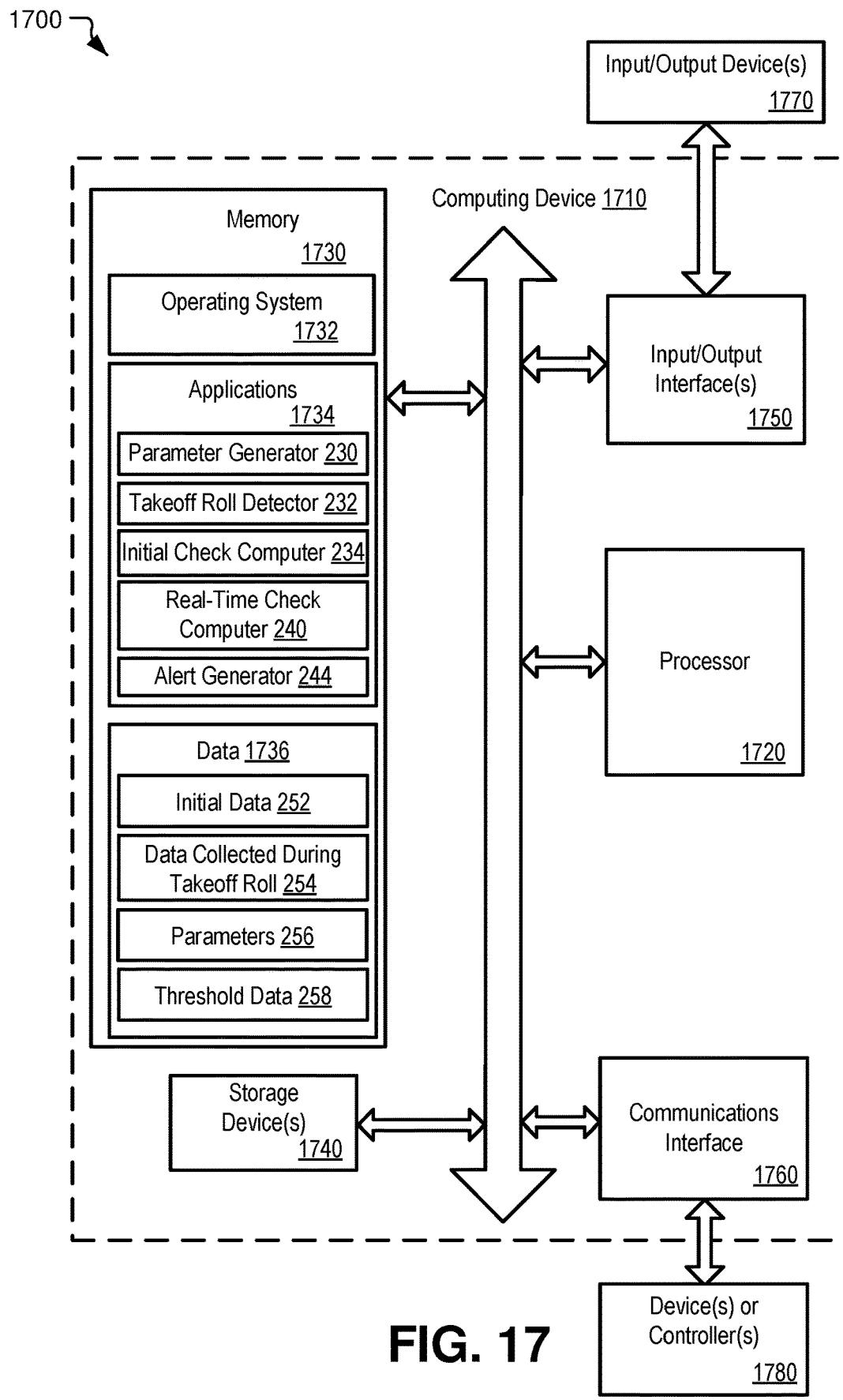
FIG. 17 is a block diagram of a computing environment including a computing device configured to support aspects of computer-implemented methods and computer-executable program instructions (or code) according to the present disclosure.

FIG. 17 is a block diagram of a computing environment 1700 including a computing device 1710 configured to support aspects of computer-implemented methods and computer-executable program instructions (or code) according to the present disclosure. For example, the computing device 1710, or portions thereof, is configured to execute instructions to initiate, perform, or control one or more operations described with reference to FIGS. 1-16. In some implementations, the computing device 1710 includes components of LRU 202.

The computing device 1710 includes one or more processors 1720. The processor(s) 1720 are configured to communicate with system memory 1730, one or more storage devices 1740, one or more input/output interfaces 1750, one or more communications interfaces 1760, or any combination thereof. The system memory 1730 includes volatile memory devices (e.g., random access memory (RAM) devices), nonvolatile memory devices (e.g., read-only memory (ROM) devices, programmable read-only memory, and flash memory), or both. The system memory 1730 stores an operating system 1732, which may include a basic input/output system for booting the computing device 1710 as well as a full operating system to enable the computing device 1710 to interact with users, other programs, and other devices. The system memory 1730 stores data 1736, such the initial data 252, the data 254 collected during the takeoff roll, the parameters 256, and the threshold data 258.

The system memory 1730 includes one or more applications 1734 (e.g., sets of instructions) executable by the processor(s) 1720. As an example, the one or more applications 1734 include instructions executable by the processor(s) 1720 to initiate, control, or perform one or more operations described with reference to FIGS. 1-16. To illustrate, the one or more applications 1734 include instructions executable by the processor(s) 1720 to initiate, control, or perform one or more operations described with reference to the LRU 202, such as the parameter generator 230, the takeoff roll detector 232, the initial check computer 234, the real-time check computer 240, the alert generator 244, or a combination thereof.

In a particular implementation, the system memory 1730 includes a non-transitory, computer-readable medium storing the instructions that, when executed by the processor(s) 1720, cause the processor(s) 1720 to initiate, perform, or control operations for generating a takeoff performance alert during a takeoff associated with an aircraft. The operations include determining, based on initial data collected prior to a takeoff roll of the aircraft, a takeoff rotation speed of the aircraft and a rotation time associated with the takeoff rotation speed. The operations include determining, during the takeoff roll and prior to the rotation time, a predicted speed of the aircraft at the rotation time. The predicted speed is at least partially based on data collected during the takeoff roll. The operations include determining whether an alert condition is satisfied at least partially based on whether a disparity between the takeoff rotation speed and the predicted speed exceeds a rotation speed disparity threshold. The operations include, in response to determining that the alert condition is satisfied, generating the takeoff performance alert.

The one or more storage devices 1740 include nonvolatile storage devices, such as magnetic disks, optical disks, or flash memory devices. In a particular example, the storage devices 1740 include both removable and non-removable memory devices. The storage devices 1740 are configured to store an operating system, images of operating systems, applications (e.g., one or more of the applications 1734), and program data (e.g., the program data 1736). In a particular aspect, the system memory 1730, the storage devices 1740, or both, include tangible computer-readable media. In a particular aspect, one or more of the storage devices 1740 are external to the computing device 1710.

The one or more input/output interfaces 1750 enable the computing device 1710 to communicate with one or more input/output devices 1770 to facilitate user interaction. For example, the input/output devices 1770 can include the user interface 206, the display device 210, the loudspeaker(s) 212, or a combination thereof. As other examples, the one or more input/output interfaces 1750 can include a display interface, an input interface, or a combination thereof. The processor(s) 1720 are configured to communicate with devices or controllers 1780 via the one or more communications interfaces 1760. For example, the one or more communications interfaces 1760 can include a network interface. The devices or controllers 1780 can include, for example, the sensor(s) 204, the TO/GA control 208, the engine thrust controller 216, the thrust reverser 218, the braking system 220, one or more other devices, or any combination thereof.

In conjunction with the described systems and methods, an apparatus for generating a takeoff performance alert during a takeoff associated with an aircraft is disclosed that includes means for determining, based on initial data collected prior to a takeoff roll of the aircraft, a takeoff rotation speed of the aircraft and a rotation time associated with the takeoff rotation speed. In some implementations, the means for determining the takeoff rotation speed and the rotation time corresponds to the parameter generator 230, the LRU 202, the FMF 502, the processor 1720, the computing device 1710, one or more other circuits or devices configured to determine the takeoff rotation speed and the rotation time, or a combination thereof.

The apparatus includes means for determining, during the takeoff roll and prior to the rotation time, a predicted speed of the aircraft at the rotation time, and the predicted speed is at least partially based on data collected during the takeoff roll. In some implementations, the means for determining the predicted speed corresponds to the parameter generator 230, the real-time check computer 240, the LRU 202, the DCA 510, the processor 1720, the computing device 1710, one or more other circuits or devices configured to determine the predicted speed of the aircraft at the rotation time, or a combination thereof.

The apparatus includes means for determining whether an alert condition is satisfied at least partially based on whether a disparity between the takeoff rotation speed and the predicted speed exceeds a rotation speed disparity threshold. In some implementations, the means for determining whether the alert condition is satisfied corresponds to the parameter generator 230, the real-time check computer 240, the LRU 202, the DCA 510, the processor 1720, the computing device 1710, one or more other circuits or devices configured to determine whether the alert condition is satisfied, or a combination thereof.

The apparatus includes means for generating the takeoff performance alert in response to determining that the alert condition is satisfied. In some implementations, the means for generating the takeoff performance alert corresponds to the alert generator 244, the display device 210, the visual indicator 260, the loudspeaker(s) 212, the LRU 202, the master warning light 602, the PFD including the indicator 604, the EICAS display including the indicator 606, the one or more loudspeakers 608, the processor 1720, the computing device 1710, one or more other circuits or devices configured to determine generate the takeoff performance alert, or a combination thereof.

In some implementations, a non-transitory, computer-readable medium stores instructions that, when executed by one or more processors, cause the one or more processors to initiate, perform, or control operations to perform part or all of the functionality described above. For example, the instructions may be executable to implement one or more of the operations or methods of FIGS. 1-16. To illustrate, the instructions of the applications 1734, when executed by the processor(s) 1720, can cause the processor(s) 1720 to initiate, perform, or control to for generating a takeoff performance alert during a takeoff associated with an aircraft. The operations include determining, based on initial data collected prior to a takeoff roll of the aircraft, a takeoff rotation speed of the aircraft and a rotation time associated with the takeoff rotation speed. The operations include determining, during the takeoff roll and prior to the rotation time, a predicted speed of the aircraft at the rotation time. The predicted speed is at least partially based on data collected during the takeoff roll. The operations include determining whether an alert condition is satisfied at least partially based on whether a disparity between the takeoff rotation speed and the predicted speed exceeds a rotation speed disparity threshold. The operations include, in response to determining that the alert condition is satisfied, generating the takeoff performance alert. In some implementations, part or all of one or more of the operations or methods of FIGS. 1-15 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Further, the disclosure comprises embodiments according to the following examples:

According to Example 1, an aircraft includes: at least one line replaceable unit configured to: determine, based on initial data collected prior to a takeoff roll of the aircraft, a takeoff rotation speed of the aircraft and a rotation time associated with the takeoff rotation speed; determine, during the takeoff roll and prior to the rotation time, a predicted speed of the aircraft at the rotation time, wherein the predicted speed is at least partially based on data collected during the takeoff roll; determine whether an alert condition is satisfied at least partially based on whether a disparity between the takeoff rotation speed and the predicted speed exceeds a rotation speed disparity threshold; and generate a takeoff performance alert in response to the alert condition being satisfied.

Example 2. The aircraft of Example 1, further including: a user interface coupled to the at least one line replaceable unit and configured to receive the initial data as user-entered data; and one or more sensors configured to provide the data collected during the takeoff roll.

Example 3. The aircraft of Example 1 or Example 2, wherein the at least one line replaceable unit is further configured to perform an initial check in response to at least one of activation of a takeoff/go around control or an engine speed metric reaching an engine speed threshold, wherein the initial check includes: determination of an estimated initial amount of remaining runway; determination of whether the aircraft is predicted to have sufficient runway to: reach a takeoff decision speed, reject takeoff upon reaching the takeoff decision speed, and after rejecting the takeoff, come to a stop before reaching an end of the runway; estimation of an all-engine go distance to achieve a designated screen height; and determination of whether the all-engine go distance is less than the estimated initial amount of remaining runway.

Example 4. The aircraft of any of Examples 1 to 3, wherein the at least one line replaceable unit is further configured to: determine, at least partially based on the data collected during the takeoff roll: an updated all-engine go distance (174)($S_{GO\text{-}TPA}$) to achieve a designated screen height; and an updated distance (175) to reach a tire limit speed; and determine whether the alert condition is satisfied further based on: whether the aircraft is predicted to achieve the designated screen height before reaching the end of the runway; and whether the aircraft is predicted to achieve the designated screen height without reaching the tire limit speed.

Example 5. The aircraft of any of Examples 1 to 4, further including at least one of: a display device configured to output the takeoff performance alert as a visual indicator to instruct an operator of the aircraft to reject takeoff; or a loudspeaker configured to output the takeoff performance alert as an audible command that instructs the operator of the aircraft to reject takeoff.

Example 6. The aircraft of any of Examples 1 to 5, wherein the aircraft includes at least one of a military aircraft or an unmanned aircraft, wherein the at least one line replaceable unit is further configured to automatically reject takeoff in response to generation of the takeoff performance alert, and wherein automatic rejection of the takeoff includes at least one of: automatic adjustment of operation of an engine to an idle forward thrust; automatic deployment a thrust reverser; or automatic initiation of braking of the aircraft.

According to Example 7, a method for generating a takeoff performance alert during a takeoff associated with an aircraft includes: determining, based on initial data collected prior to a takeoff roll of the aircraft, a takeoff rotation speed of the aircraft and a rotation time associated with the takeoff rotation speed; determining, during the takeoff roll and prior to the rotation time, a predicted speed of the aircraft at the rotation time, wherein the predicted speed is at least partially based on data collected during the takeoff roll; determining whether an alert condition is satisfied at least partially based on whether a disparity between the takeoff rotation speed and the predicted speed exceeds a rotation speed disparity threshold; and in response to determining that the alert condition is satisfied, generating the takeoff performance alert.

Example 8. The method of Example 7, wherein the initial data is received as user-entered data at an interface to a flight management computer prior to the takeoff roll.

Example 9. The method of Example 7 or Example 8, wherein collection of the data during the takeoff roll is initiated responsive to the aircraft reaching a first speed, and wherein determination of the predicted speed is performed responsive to the aircraft reaching a second speed that is greater than the first speed.

Example 10. The method of any of Examples 7 to 9, further including: performing an initial check prior to determining the predicted speed, wherein said performing the initial check includes: determining an estimated initial amount of remaining runway; determining whether the aircraft is predicted to have sufficient runway to: reach a takeoff decision speed, reject the takeoff upon reaching the takeoff decision speed, and after rejecting the takeoff, come to a stop before reaching an end of the runway; and determining whether to generate the takeoff performance alert based on the initial check.

Example 11. The method of Example 10, wherein performing said initial check further includes determining whether the aircraft is predicted to have sufficient runway to take off.

Example 12. The method of Example 11, wherein said determining whether the aircraft is predicted to have sufficient runway to take off includes: determining an estimated all-engine go distance to achieve a designated screen height; and determining whether the estimated all-engine go distance is less than the estimated initial amount of remaining runway.

Example 13. The method of any of Examples 10 to 12, wherein said determining whether the aircraft is predicted to have sufficient runway to reach the takeoff decision speed, reject the takeoff, and come to a stop includes: determining a first estimated distance to reach the takeoff decision speed; determining a second estimated distance required to come to a stop after reaching the takeoff decision speed; and determining whether the estimated initial amount of remaining runway, reduced by the first estimated distance, exceeds the second estimated distance.

Example 14. The method of any of Examples 10 to 13, wherein the initial check is performed in response to at least one of: activation of a takeoff/go around control; or an engine speed metric reaching an engine speed threshold.

Example 15. The method of any of Examples 7 to 14, wherein said determining whether the alert condition is satisfied is further based on whether the aircraft is predicted to have sufficient runway to achieve a designated screen height before reaching an end of the runway.

Example 16. The method of any of Examples 7 to 14, further including: determining, at least partially based on the initial data collected prior to the takeoff roll, an estimated initial amount of remaining runway; and determining, at least partially based on the data collected during the takeoff roll, an updated all-engine go distance to achieve a designated screen height; wherein said determining whether the alert condition is satisfied is further based on determining whether the updated all-engine go distance is greater than the estimated initial amount of remaining runway.

Example 17. The method of any of Examples 7 to 16, wherein said determining whether the alert condition is satisfied is further based on whether the aircraft is predicted to achieve a designated screen height without reaching a tire limit speed.

Example 18. The method of any of Examples 7 to 16, further including determining, at least partially based on the data collected during the takeoff roll: an updated all-engine go distance to achieve a designated screen height; and an updated distance to reach a tire limit speed; wherein said determining whether the alert condition is satisfied is further based on determining whether the updated all-engine go distance is greater than the updated distance to reach the tire limit speed.

Example 19. The method of any of Examples 7 to 18, wherein said generating the takeoff performance alert includes at least one of: displaying a visual indicator instructing an operator of the aircraft to reject takeoff; or generating an audible command instructing the operator of the aircraft to reject takeoff.

Example 20. The method of any of Examples 7 to 19, wherein the aircraft includes at least one of a military aircraft or an unmanned aircraft, and further including: automatically rejecting takeoff in response to generation of the takeoff performance alert, wherein said automatically rejecting the takeoff includes at least one of: automatically adjusting operation of an engine to an idle forward thrust; automatically deploying a thrust reverser; or automatically initiating braking of the aircraft.

According to Example 21, a device includes: a memory configured to store instructions; and a processor configured to execute the instructions to perform the method of any of Examples 7 to 20.

According to Example 22, a computer-readable medium stores instructions that, when executed by one or more processors, cause the one or more processors to perform the method of any of Examples 7 to 20.

According to Example 23, an apparatus includes means for carrying out the method of any of Examples 7 to 20.

According to Example 24, a non-transitory, computer-readable medium stores instructions that, when executed by one or more processors, cause the one or more processors to initiate, perform, or control operations for generating a takeoff performance alert during a takeoff associated with an aircraft, the operations including: determining, based on initial data collected prior to a takeoff roll of the aircraft, a takeoff rotation speed of the aircraft and a rotation time associated with the takeoff rotation speed; determining, during the takeoff roll and prior to the rotation time, a predicted speed of the aircraft at the rotation time, where the predicted speed is at least partially based on data collected during the takeoff roll; determining whether an alert condition is satisfied at least partially based on whether a disparity between the takeoff rotation speed and the predicted speed exceeds a rotation speed disparity threshold; and in response to determining that the alert condition is satisfied, generating the takeoff performance alert.

According to Example 25, an apparatus includes: means for determining, based on initial data collected prior to a takeoff roll of the aircraft, a takeoff rotation speed of the aircraft and a rotation time associated with the takeoff rotation speed; means for determining, during the takeoff roll and prior to the rotation time, a predicted speed of the aircraft at the rotation time, where the predicted speed is at least partially based on data collected during the takeoff roll; means for determining whether an alert condition is satisfied at least partially based on whether a disparity between the takeoff rotation speed and the predicted speed exceeds a rotation speed disparity threshold; and means for generating the takeoff performance alert in response to determining that the alert condition is satisfied.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
at least one line replaceable unit configured to:
  collect initial data prior to a takeoff roll of the aircraft;
  collect data during the takeoff roll responsive to the aircraft reaching a first speed;
  determine, based on the initial data, a takeoff rotation speed of the aircraft and a rotation time associated with the takeoff rotation speed;
  determine, during the takeoff roll and prior to the rotation time, a predicted speed of the aircraft at the rotation time, wherein the predicted speed is at least partially based on data collected during the takeoff roll, and wherein determination of the predicted speed is performed responsive to the aircraft reaching a second speed that is greater than the first speed;
  determine whether an alert condition is satisfied at least partially based on whether a disparity between the takeoff rotation speed and the predicted speed exceeds a rotation speed disparity threshold; and
  generate a takeoff performance alert in response to the alert condition being satisfied.

2. The aircraft of claim 1, further comprising:
a user interface coupled to the at least one line replaceable unit and configured to receive the initial data as user-entered data; and
one or more sensors configured to provide the data collected during the takeoff roll.

3. The aircraft of claim 1, wherein the at least one line replaceable unit is further configured to perform an initial check in response to at least one of activation of a takeoff/go around control or an engine speed metric reaching an engine speed threshold, wherein the initial check includes:
determination of an estimated initial amount of remaining runway;
determination of whether the aircraft is predicted to have sufficient runway to: reach a takeoff decision speed, reject takeoff upon reaching the takeoff decision speed, and after rejecting the takeoff, come to a stop before reaching an end of the runway;
estimation of an all-engine go distance to achieve a designated screen height; and
determination of whether the all-engine go distance is less than the estimated initial amount of remaining runway.

4. The aircraft of claim 1, wherein the at least one line replaceable unit is further configured to:

determine, at least partially based on the data collected during the takeoff roll:
an updated all-engine go distance to achieve a designated screen height; and
an updated distance to reach a tire limit speed; and
determine whether the alert condition is satisfied further based on:
whether the aircraft is predicted to have sufficient runway to achieve the designated screen height before reaching the end of the runway; and
whether the aircraft is predicted to achieve the designated screen height without reaching the tire limit speed.

5. The aircraft of claim 1, further comprising at least one of:
a display device configured to output the takeoff performance alert as a visual indicator to instruct an operator of the aircraft to reject takeoff; or
a loudspeaker configured to output the takeoff performance alert as an audible command that instructs the operator of the aircraft to reject takeoff.

6. The aircraft of claim 1, wherein the aircraft includes at least one of a military aircraft or an unmanned aircraft, wherein the at least one line replaceable unit is further configured to automatically reject takeoff in response to generation of the takeoff performance alert, and wherein automatic rejection of the takeoff includes at least one of:
automatic adjustment of operation of an engine to an idle forward thrust;
automatic deployment a thrust reverser; or
automatic initiation of braking of the aircraft.

7. A method for generating a takeoff performance alert during a takeoff associated with an aircraft, the method comprising:
collecting initial data prior to a takeoff roll of the aircraft;
collecting data during the takeoff roll responsive to the aircraft reaching a first speed;
determining, based on the initial data, a takeoff rotation speed of the aircraft and a rotation time associated with the takeoff rotation speed;
determining, during the takeoff roll and prior to the rotation time, a predicted speed of the aircraft at the rotation time, wherein the predicted speed is at least partially based on data collected during the takeoff roll, and wherein determination of the predicted speed is performed responsive to the aircraft reaching a second speed that is greater than the first speed;
determining whether an alert condition is satisfied at least partially based on whether a disparity between the takeoff rotation speed and the predicted speed exceeds a rotation speed disparity threshold; and
in response to determining that the alert condition is satisfied, generating the takeoff performance alert.

8. The method of claim 7, wherein the initial data is received as user-entered data at an interface to a flight management computer prior to the takeoff roll.

9. The method of claim 7, wherein the data collected during the takeoff roll is collected from one or more sensors.

10. The method of claim 7, further comprising:
performing an initial check prior to determining the predicted speed, wherein said performing the initial check includes:
determining an estimated initial amount of remaining runway;
determining whether the aircraft is predicted to have sufficient runway to: reach a takeoff decision speed, reject the takeoff upon reaching the takeoff decision speed, and after rejecting the takeoff, come to a stop before reaching an end of the runway; and
determining whether to generate the takeoff performance alert based on the initial check.

11. The method of claim 10, wherein performing said initial check further includes determining whether the aircraft is predicted to have sufficient runway to take off.

12. The method of claim 11, wherein said determining whether the aircraft is predicted to have sufficient runway to take off includes:
determining an estimated all-engine go distance to achieve a designated screen height; and
determining whether the estimated all-engine go distance is less than the estimated initial amount of remaining runway.

13. The method of claim 10, wherein said determining whether the aircraft is predicted to have sufficient runway to reach the takeoff decision speed, reject the takeoff, and come to a stop includes:
determining a first estimated distance to reach the takeoff decision speed;
determining a second estimated distance required to come to a stop after reaching the takeoff decision speed; and
determining whether the estimated initial amount of remaining runway, reduced by the first estimated distance, exceeds the second estimated distance.

14. The method of claim 10, wherein the initial check is performed in response to at least one of:
activation of a takeoff/go around control; or
an engine speed metric reaching an engine speed threshold.

15. The method of claim 7, wherein said determining whether the alert condition is satisfied is further based on whether the aircraft is predicted to have sufficient runway to achieve a designated screen height before reaching an end of the runway.

16. The method of claim 7, further comprising:
determining, at least partially based on the initial data collected prior to the takeoff roll, an estimated initial amount of remaining runway; and
determining, at least partially based on the data collected during the takeoff roll, an updated all-engine go distance to achieve a designated screen height,
wherein said determining whether the alert condition is satisfied is further based on determining whether the updated all-engine go distance is greater than the estimated initial amount of remaining runway.

17. The method of claim 7, wherein said determining whether the alert condition is satisfied is further based on whether the aircraft is predicted to achieve a designated screen height without reaching a tire limit speed.

18. The method of claim 7, further comprising determining, at least partially based on the data collected during the takeoff roll:
an updated all-engine go distance to achieve a designated screen height; and
an updated distance to reach a tire limit speed,
wherein said determining whether the alert condition is satisfied is further based on determining whether the updated all-engine go distance is greater than the updated distance to reach the tire limit speed.

19. The method of claim 7, wherein said generating the takeoff performance alert includes at least one of:
displaying a visual indicator instructing an operator of the aircraft to reject takeoff; or
generating an audible command instructing the operator of the aircraft to reject takeoff.

20. The method of claim 7, wherein the aircraft includes at least one of a military aircraft or an unmanned aircraft, and further comprising:
  automatically rejecting takeoff in response to generation of the takeoff performance alert, wherein said automatically rejecting the takeoff includes at least one of:
    automatically adjusting operation of an engine to an idle forward thrust;
    automatically deploying a thrust reverser; or
    automatically initiating braking of the aircraft.

* * * * *